US012748860B1

(12) United States Patent
Colon et al.

(10) Patent No.: US 12,748,860 B1
(45) Date of Patent: Sep. 29, 2026

(54) AUTOMATED CHARACTERIZATION OF NETWORK-BASED APPLICATIONS

(71) Applicant: Amazon Technologies, Inc., Seattle, WA (US)

(72) Inventors: Brendan Cruz Colon, Seattle, WA (US); John Bernard Flynn, San Francisco, CA (US); Yong Qiao, Millbrae, CA (US); Jessica Erin Clark, Lake Forest Park, WA (US); Adam Edward Powers, El Dorado Hills, CA (US); Michael Clayton Moran, Seattle, WA (US); Vaibhav Bhushan Sharma, Cupertino, CA (US); Jingmei Hu, San Jose, CA (US); Swaha Das Miller, Saratoga, CA (US); Ryhan Moghe, Basking Ridge, NJ (US); Sai Madhu Bhargav Pallem, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/900,441

(22) Filed: Sep. 27, 2024

(51) Int. Cl.
*H04L 29/06* (2006.01)
*G06F 21/57* (2013.01)

(52) U.S. Cl.
CPC ...... *G06F 21/577* (2013.01); *G06F 2221/033* (2013.01)

(58) Field of Classification Search
CPC ............. G06F 21/577; G06F 2221/033; H04L 63/0263; H04L 63/1433; H04L 63/20; H04L 63/105
See application file for complete search history.

(56) References Cited

U.S. PATENT DOCUMENTS 12,430,464 B2 * 9/2025 Crume ................ G06F 21/6245
2024/0311563 A1 * 9/2024 Somech ................ G06F 40/295

* cited by examiner

*Primary Examiner* — Longbit Chai
(74) *Attorney, Agent, or Firm* — Knobbe, Martens, Olson & Bear, LLP

(57) ABSTRACT

The present disclosure relate to systems and methods for providing a network-based application characterization in prior to deploying a network-based application. An application characterization service may obtain, a configured network based application, the configured network based application corresponds to a set of application attributes of one or more network services from a plurality of network services, in response to obtaining the configured network based application, identify inputs, the identified inputs representing attributes of the configured network based application, wherein each attribute of the identified inputs provided via a generative agent comprising a context window and a prompt, truncate the identified inputs, perform context window curation, dynamically update the prompt, and perform risk assessment on the updated prompt.

25 Claims, 8 Drawing Sheets

AUTOMATED CHARACTERIZATION OF NETWORK-BASED APPLICATIONS

BACKGROUND

Generally described, external computing devices and communication networks can be utilized to exchange data and/or information. In a common application, an external computing device can request content from another external computing device via the communication network. For example, a user having access to an external computing device can utilize a software application to request content or access network-hosed applications/functionality from an external computing device via the network (e.g., the Internet). Additionally, the external computing device can collect or generate information and provide the collected information to a network-based customer computing device for further processing or analysis. The external computing device can be referred to as a customer computing device.

In some embodiments, a network service provider can provide various types of network-based services that are configurable to execute tasks based on inputs received from customer computing devices. In some embodiments, communications and associated interactions between a network service provider and a customer computing device can conform to a template, such as an application configuration template corresponding to network-based applications. In accordance with this approach, the customer, by utilizing the application configuration template, can build one or more network-based applications.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
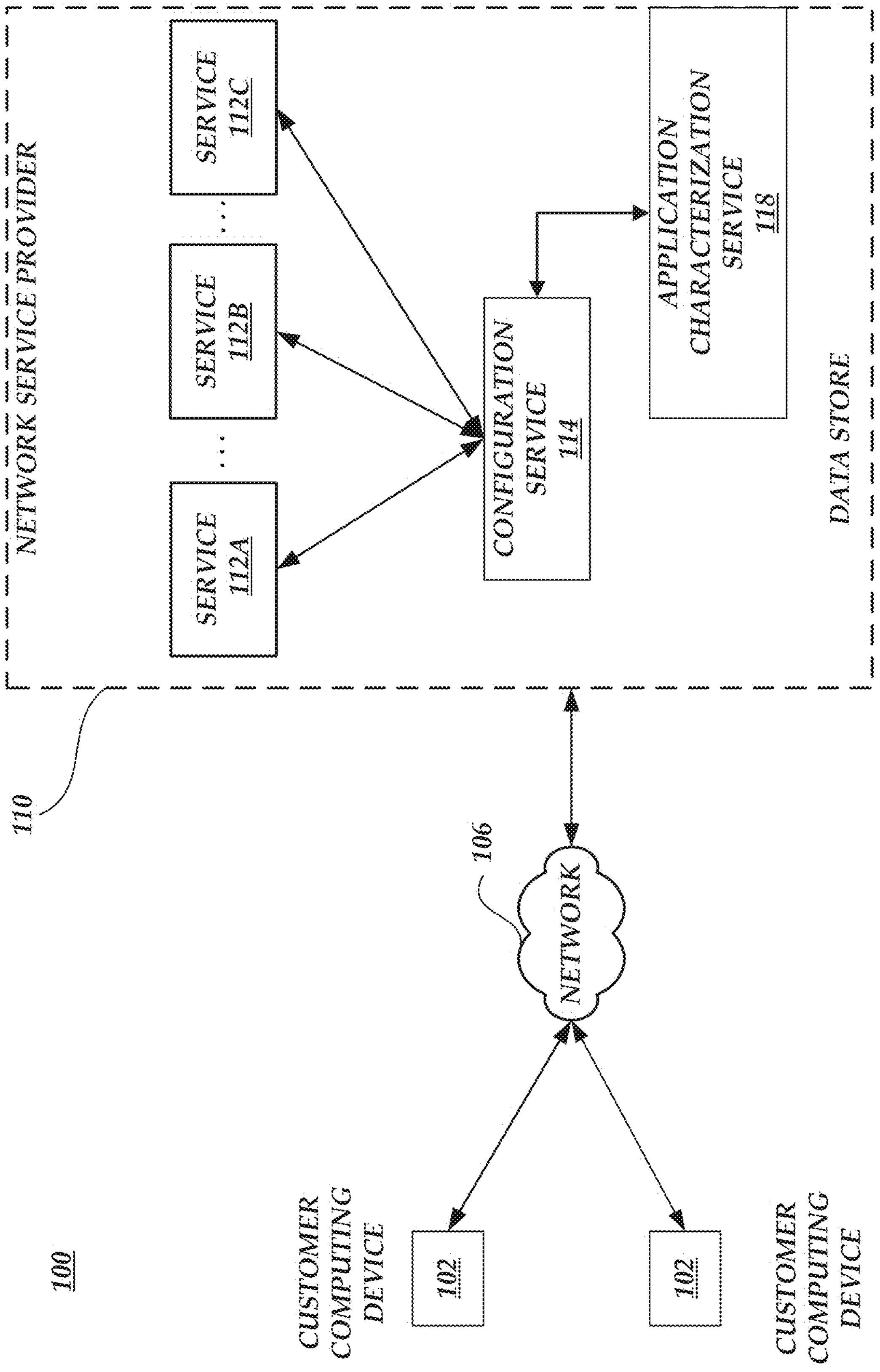
FIG. 1 depicts a block diagram of a network system that includes one or more customer computing devices, a network service provider, a configuration service, an application characterization service, and a database according to one embodiment.

Aspects of the present disclosure relate to systems and methods for providing an application characterization service for characterizing a set of network application attributes (hereinafter "application characterization service"). In the context of a network-based service, characterizing a set of network application attributed (generally referred to as "application characterization") refers to a set of processes designed to evaluate, identify, and manage potential risks associated with the functionality of a network-based application. More specifically, aspects of the present application correspond to characterizing set of application attributes of a network application, which defines the application's functionality.

In some embodiments, the functionality of the network-based application is defined using a plurality of attributes and their associated parameters (e.g., values or policy assigned to/associated with each attribute). For example, the attribute can be accessing to a specific database, and the parameter can be the latency time associated with accessing the database and/or policy associated with accessing the database. This example is merely provided as illustrative purpose for description, and the types and numbers of attributes and its associated parameters are not limited herein. At least some portion of the defined attributes within the set of application attributes are considered inputs to the network application that can manage various aspects of the application's functionality or behavior, such as database connections, user permissions, feature toggles, and more. Illustratively, aspects of the present disclosure involve characterizing the set of application attributes, or portions thereof, of the network-based application, enabling analysis of the application's performance or behavior by identifying and processing the attributes within the set of application attributes. The behavior, in general terms, refers to the application's functionality as executed based on these attributes.

In some examples, the application characterization service can evaluate specific parameters of the defined set of application attributes against thresholds or defined standards, assessing performance, risk, and other factors. This evaluation may allow for the identification, filtering or execution of mitigation techniques, such as preventing the deployment of the configured network-based application if necessary. For example, the application characterization service can make individual characterizations, such as risk assessments, of individual parameters (including values) for the identified set of application attributes. For example, if parameters for an identified attribute include location information of a specific database, the application characterization service may evaluate the associated risks within the network path to the specific location, such as vulnerabilities or security encryption, when accessing the specific database identified as the parameter. In another example, the application characterization service might evaluate specific parameter values related to computing resource utilization, vulnerabilities in the source code of the set of application attributes, security (or encryption) levels for processing certain attributes, and similar considerations.

In some examples, such application characterization service may be implemented in a manner that follows a machine learning model to characterize the set of application attributes and associated parameter values. As disclosed herein, the application characterization service can be implemented with hardware and software components in the network service provider, such as network infrastructure components configured to provide the network-based services. The network infrastructure components can be any networking, data storage and processing, network management, cloud infrastructure (e.g., servers), and the like, and the present disclosure does not limit the location, types, and numbers of network infrastructure components that implement the application characterization service.

Traditional network-based application analysis and characterization pose significant technical challenges for both customers and network service providers. Specifically, administrators or reviewers must manually identify potential risks associated with the functionality of network-based applications, relying heavily on the customer's (or application developer's) attestation. Each application may introduce risks associated with the application's behavior, such as those related to database access (e.g., resources), user data collection, permission evaluation, data encryption, and more. In this approach, the application characterization depends on the veracity and completeness of the customer's attestation, including details such as what data users are permitted to access, the permission levels for database access, the policies applied, and similar factors. Consequently, if the attestation contains misleading or incorrect information or otherwise incomplete, the manual risk assessment may be inaccurate or incomplete.

Moreover, manual risk assessment presents technical limitations. Human reviewers may not be able to evaluate risks based on up-to-date information, such as newly implemented policies, emerging vulnerabilities (e.g., new malware attack vectors), or changes to the application's source code, directories, or libraries. For example, the human reviewers may not automatically identify the changes made in the source code, directories, or libraries, so the human reviewer may not identify the technical functionality of the application applying these changes and may only rely on the application operator's (e.g., developer, distributor, and the like) attests on technical functionality of the application in response to these changes. This makes it difficult to accurately assess the potential risk of the application. Additionally, human-based evaluations of network-based application risks are inherently limited in scope. For example, a human reviewer may lack the technical capability to compile source code or detect network vulnerabilities, further hindering the thoroughness of the assessment.

To address at least a portion of the above-described deficiencies, one or more aspects of the present disclosure correspond to systems and methods for providing application characterization service that can perform characterization (e.g., risk characterization) associated with network-based applications. As previously described, in accordance with one or more aspects of the present application, the application characterization service can determine/identify attributes and the respective behaviors of network-based applications based on the parameter values. For example, the determined/identified set of application attributes (e.g., characterized attributes of the set of application attributes) can be generated as an output vector. Such application attributes are characterized, where the characterized attributes can generally provide, but are not limited to, security vulnerabilities, data breaches (e.g., data breach vulnerability), system failures, system computation errors, performance issues, or compliance violations (e.g., compliance with data access, management, usage, and the like) associated with the execution of the network-based application. For the purpose of description, the attribute can refer to a behavior of the network-based application, and the parameter of the attribute can define one or more variables of the corresponding attribute. For example, the parameter can define how the attribute behaves, such that if the attribute is sending data to a specific internet protocol address, the parameter can be the packet size associated with the specific internet protocol. In various aspects, as disclosed herein, the application characterization service can systematically assess the network-based application, identify possible threats, and provide recommendations to mitigate those risks to ensure the application's resilience, security, and operational efficiency before deploying the applications as a network service. For the purposes of this description, the term 'network-based application characterization,' or simply 'characterization,' refers broadly to the process of making assessments associated with a network-based application's behavior based on its attributes. This includes, but is not limited to, characterizing aspects of functionality, such as resource consumption, security, data usage, interactions with data resources and other applications, and compliance with policies. For example, characterization can involve analyzing the application's behavior when executing instructions associated with each of its attributes. As described herein, characterizations include, but are not necessarily limited to risk characterizations of the network application.

In some aspects, the application characterization service can utilize machine learning model(s) configured to perform one or more of the processes described herein. In some embodiments, the machine learning model can be trained to generate outputs that identify attributes of the set of application attributes and identify the application's behavior associated with the parameter values of each identified attribute. As previously described, at least some portion of the attributes will be input to the machine learning model, such as data (such as types, locations, and amount of data), policy, raw data, source code, computation procedure (e.g., computational diagram), and/or any other information associated with usage of the network-based applications.

In certain aspects, the application characterization service can utilize a machine learning model to further process the output vector (e.g., vectorized characterized attributes of the set of application attributes). For example, the machine learning model can be configured to generate outputs that cluster each vectorized historical attribute along with its corresponding output vector, and these clustered pairs can be stored in a database. Additionally, the machine learning model can be configured to generate a confidence score for each clustered pair, which can also be stored in the database. This confidence score can then be used to retrain the machine learning model.

In some aspects, the application characterization service can be configured to process the attributes of the network-based application. In some examples, the application characterization service can classify the attributes and further process the classified attributes into sub-groups. Such process can be referred to as tokenization. For example, if the attribute is identified as an uniform resource locator, such as "arn:aws:cloudformation:us-east-1:671471118425: stack/DatabaseStack-d1f24867-f826-4520-b2f9-8ac72751d4c6/8e8425f0-794a-11ee-85dd-1272e2b5acdf," the application characterization service can tokenize this attribute into three groups that can be determined to be meaningfully distinct for purposes of the processing, such as "arn:aws:cloudformation," "us-east-1:671471118425," and "stack/DatabaseStack-d1f24867-f826-4520-b2f9-8ac72751d4c6/8e8425f0-794a-11ee-85dd-1272e2b5acdf." In this example, the application characterization service can represent each tokenized attribute into a vector.

In some embodiments, the application characterization service can optimize its computing resources by initially filtering the number of attributes (or tokenized attributes). This process may involve truncating the number of attributes. For instance, the application characterization service can pre-process the attributes using a designated relevancy vector database, which is configured to store a plurality of input attributes and their associated determined risks. These vectorized historical attributes and their corresponding data usage information (e.g., historical data usage) are derived from previous characterizations performed on one or more other applications. For example, the application characterization service can vectorize the attribute “us-east-1:671471118425” and identify the same input by comparing the vector distance of this attribute with the data stored in the relevancy vector database. From this comparison, it can retrieve the associated risk from historical characterization results, such as identifying a potential access encryption issue linked to this attribute. The truncation process filters attributes based on the pre-processed results (e.g., the corresponding historical data usage of each attribute). For instance, after identifying the historical data usage of attributes like “arn:aws,” “us-east-1:671471118425,” and “stack/DatabaseStack-d1f24867-f826-4520-b2f9-8ac72751d4c6/8e8425f0-794a-11ee-85dd-1272e2b5acdf,” the application characterization service can filter these inputs based on a pre-defined threshold, such as the security risk associated with their historical usage. If the historical data usage of an attribute (e.g., access to a database) indicates no security threat (e.g., network vulnerability, specific encryption policy requirements, etc.), the attribute may not pose a security risk. In this case, the threshold could be determined by whether historical data usage indicates any security risk. For example, if the attributes “us-east-1:671471118425” and “stack/DatabaseStack-d1f24867-f826-4520-b2f9-8ac72751d4c6/8e8425f0-794a-11ee-85dd-1272e2b5acdf” are identified as having security risks (e.g., indicating potential access encryption issues), they may be flagged as potentially risky. Conversely, attributes that do not pose any security risk can be filtered out (i.e., truncated). This truncation step advantageously enhances the efficiency of computing resource utilization by focusing the characterization process on the remaining attributes after filtering.

In various aspects, the application characterization service can utilize the machine learning model by implementing a generative agent. This generative agent leverages an embedded model within the application characterization service to provide inputs to the machine learning model and generate responses by utilizing the machine learning model. The generative agent operates using prompts and context windows. A prompt refers to the input or instruction (e.g., attribute of the network-based application) given to the generative agent, directing it to perform a specific action by utilizing the machine learning model. For example, if the attribute is “us-east-1:671471118425,” this attribute is provided to the generative agent as the prompt, where the generative agent can characterize the attribute by utilizing the machine learning model.

The context window defines the maximum number of inputs the generative agent can process. For instance, if an attribute from the network-based application (e.g., set of application attributes of the application) is tokenized into 200,000 tokens, and the context window can accommodate 200,000 tokens or more, all tokenized attributes can be processed and characterized. However, if the context window is smaller than 200,000 tokens, some tokenized attribute may be dropped or evaluated with risk constraints by performing context window curation. In some aspects, the context window curation can involve selectively choosing which inputs (attributes or tokenized attributes) to include in the context window to ensure efficient processing. Inputs may be curated based on risk constraints, such as their relevance, risk level, or restrictions, and non-essential or restricted inputs may be excluded to focus resources on higher-priority input data. For example, if an attribute of a set of application attributes of a network-based application indicates accessing to a certain database, where accessing the certain database is flagged as a restricted address, the context window curation might involve flagging that input and temporarily excluding it from further analysis until the restriction is lifted. In some examples, the application characterization service can identify whether the certain database is restricted by monitoring the current status of the certain database access. For example, the application characterization service can identify one or more other network-based applications that attempt to access the certain database and determine the status (or related attributes) for accessing the certain database. This can ensure that the system doesn’t waste resources processing restricted or less relevant data, and instead focuses on inputs that require immediate risk evaluation. In some examples, the context window curation helps the system manage the available input data efficiently, optimize the use of computational resources, and ensure that the most relevant or critical information is processed within the model’s capacity. For example, the application characterization service can evaluate inputs from a network-based application and determine whether they are permissible upon deployment. If an input references a restricted address, such as “stack/DatabaseStack-d1f24867-f826-4520-b2f9-8ac72751d4c6/8e8425f0-794a-11ee-85dd-1272e2b5acdf,” the application characterization service can flag the input as restricted. As a result, the token associated with this input may be disabled or blocked from further access.

Additionally, the application characterization service can provide a dynamic prompting architecture. In this system, prompts are dynamically updated by identifying additional instructions to refine the characterization of attributes of the network-based application. For example, when an attribute indicates accessing to “stack/DatabaseStack-d1f24867-f826-4520-b2f9-8ac72751d4c6/8e8425f0-794a-11ee-85dd-1272e2b5acdf,” wherein this access is flagged as restricted, the dynamic prompting architecture may identify and supplement a policy related to accessing this address. The policy may specify encryption keys or network environments required for access. This allows the application characterization service to further evaluate the risk associated with accessing the input based on the newly supplemented policy. Such newly supplemented policy can refer to a parameter of the attribute.

In some examples, when a prompt is dynamically modified (e.g., by supplementing a new parameter associated with the attribute), the application characterization service can conduct regression testing to ensure that the updated prompt does not negatively affect the characterization of the attributes (of the network-based application).

In some aspects, the application characterization service can verify the machine learning model from hallucination. Specifically, the application characterization service can monitor the output of the machine learning model and filter out the output associated with hallucination. In some examples, the application characterization service can include (e.g., an internal database) or in communication with a database dedicated to storing data associated with hallucination output. For example, the stored data can be identified as hallucination output based on reinforcement learning from human feedback, such that each output of the machine learning model utilized in the application characterization service can be annotated by human feedback, where the hallucinated output can be flagged.

In some embodiments, the application characterization service can cluster the inputs and outputs (e.g., characterization results for each attribute). The clustering can be performed by representing each attribute and output in a vector. For example, clustering can be performed by grouping the databased on their vector distance within a threshold distance, such that the data within a threshold distance from a centroid of each cluster can be grouped. In some cases, each cluster can further be evaluated by assigning a confidence score. For example, a post-evaluation of the application characterization service (e.g., machine learning model) can be performed by evaluating whether each cluster contains false positives or negatives. After the evaluation, a confidence score for each cluster can be assigned.

Although aspects of the present disclosure will be described with regard to illustrative network components, interactions, and routines, one skilled in the relevant art will appreciate that one or more aspects of the present disclosure may be implemented in accordance with various environments, system architectures, customer computing device architectures, and the like. Similarly, references to specific devices, such as a customer computing device, can be considered to be general references and not intended to provide additional meaning or configurations for individual customer computing devices. Additionally, the examples are intended to be illustrative in nature and should not be construed as limiting.

FIG. 1 depicts a block diagram of an embodiment of the system 100. The system 100 can include a network 106, the network connecting a number of customer computing devices 102, and network-based services 112. Illustratively, the various aspects associated with the network service provider 110 can be implemented as one or more components that are associated with one or more functions or services. The components may correspond to software modules implemented or executed by one or more customer computing devices, which may be separate stand-alone customer computing devices. Accordingly, the components of the network service provider 110 should be considered as a logical representation of the service, not requiring any specific implementation on one or more customer computing devices.

Network 106, as depicted in FIG. 1, connects the devices and modules of the system. The network 106 can connect any number of devices. In some embodiments, a network service provider 110 provides network-based services 112A-112C to customer computing devices via a network 106. In some examples, the network-based services 112A-112C can be provided via a network-based application provided to the customer computing device 102. Such network-based application can be provided with an application programing interface that provides instructions related to the set of rules associated with the execution of the application, protocols, and/or tools that enable the application to interact with external systems, services, or libraries, facilitating seamless integration of the application with other software or hardware components of the network service provider. A network service provider 110 implements network-based services and refers to a large, shared pool of network-accessible computing resources (such as compute, storage, or networking resources, applications, or services), which may be virtualized or bare-metal. The network service provider 110 can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provides those services.

The customer computing device 102 in FIG. 1 can connect to the network service provider 110 via the network 106. The customer computing device 102 may be representative of a computing network associated with a plurality of customer computing devices. Solely for illustration purposes, customer computing device 102 represents a customer's action to access to services 112 and building network-based application via the configuration service 114. The configuration service 114 can also be provided as a service 112 to build a network-based application. For example, the configuration service 114 can provide one or more templates utilized for building network-based applications based on the customer's application configuration inputs provided from customer computing device 102. In some embodiments, the configuration service 114 can provide various application set of application attributes, and the customer via the customer computing device 102 can define parameter of each attribute of the application set of application attributes. The present disclosure does not limit the process or method of building the network-based application.

The customer computing device 102 can be configured to have at least one processor. That processor can be in communication with the memory for maintaining computer-executable instructions. The customer computing device 102 may be physical or virtual. The customer computing devices 102 may be mobile devices, personal computers, servers, or other types of devices. The customer computing device 102 may have a display and input device through which a user can interact with the user-interface component.

Illustratively, the network service provider 110 can include a plurality of network-based services that can provide functionality responsive to configurations/requests transmitted by the customer computing devices 102, such as in the building network-based applications and implementation of a set of microservices that are configured to provide underlying functionality to the customer computing device 102 (e.g., to facilitate building the network-based applications). As illustrated in FIG. 1, the network service provider 110 can include a set of network-based services 112A, 112B, 112C, etc. (generally referred to as network-based services, network services, or services). Illustratively, each service can be configured with defined functions that can be accessed based on communication or executable commands. One or more services 112 can be accessed directly with communications transited by the customer computing device 102 via various interfaces. Additionally, one or more services 112 may also be considered dependent services or complimentary services that are accessed based on communications or commands from other services. Such dependent or complimentary services 112 may or may not be directly accessible to communications from the customer computing device 102 (even if the execution of the dependent or complimentary services is being performed on behalf of the customer). Without limitation, the services 112A-112C can include virtualization services, streaming services, query processing services, data processing services, data storage or warehousing services, analytics services, database services, monitoring services, security services, content delivery services, and the like. In addition, such services 112A-112C can be provided via network-based application.

For purposes of the present application, as described herein, each of the services 112A, 112B, 112C can implement some form of network infrastructure configuration process as part of the service configuration process. The network infrastructure configuration can refer to setting network policies, flows, controls, or managing cloud computing infrastructure to access and use the service. In addition, each service can have its own attributes and required values to be configured in an infrastructure configuration process. Illustratively, the service 112 can be automatically configured by performing the infrastructure configuration process corresponding to the service, such as with necessary attributes, to allow the customer to use the service 112.

The network service provider 110 further includes an application characterization service 118. The application characterization service 118 can characterize attributes associated with network-based applications. The characterization, as disclosed herein, refers to a set of processes designed to evaluate, identify, and manage potential risks associated with the set of application attributes of a network-based application. In some embodiments, the network-based application can be configured based on set of application attributes that includes a plurality of attributes, each attribute define at least one functionality associated with the application. In these embodiments, the configuration service 114 can provide the set of application attributes, including attributes and their associated parameter, to the application characterization service 118. These attributes within the set of application attributes can manage various aspects of the application's functionality or behavior, such as database connections, user permissions, feature toggles, and more. The behavior can refer to the application's functionality as executed based on these attributes. In various embodiments, as disclosed herein, the application characterization service 118 can systematically characterize the set of application attributes of network-based applications and identify possible risks associated with the behavior of the network-based application.

Figure 2:
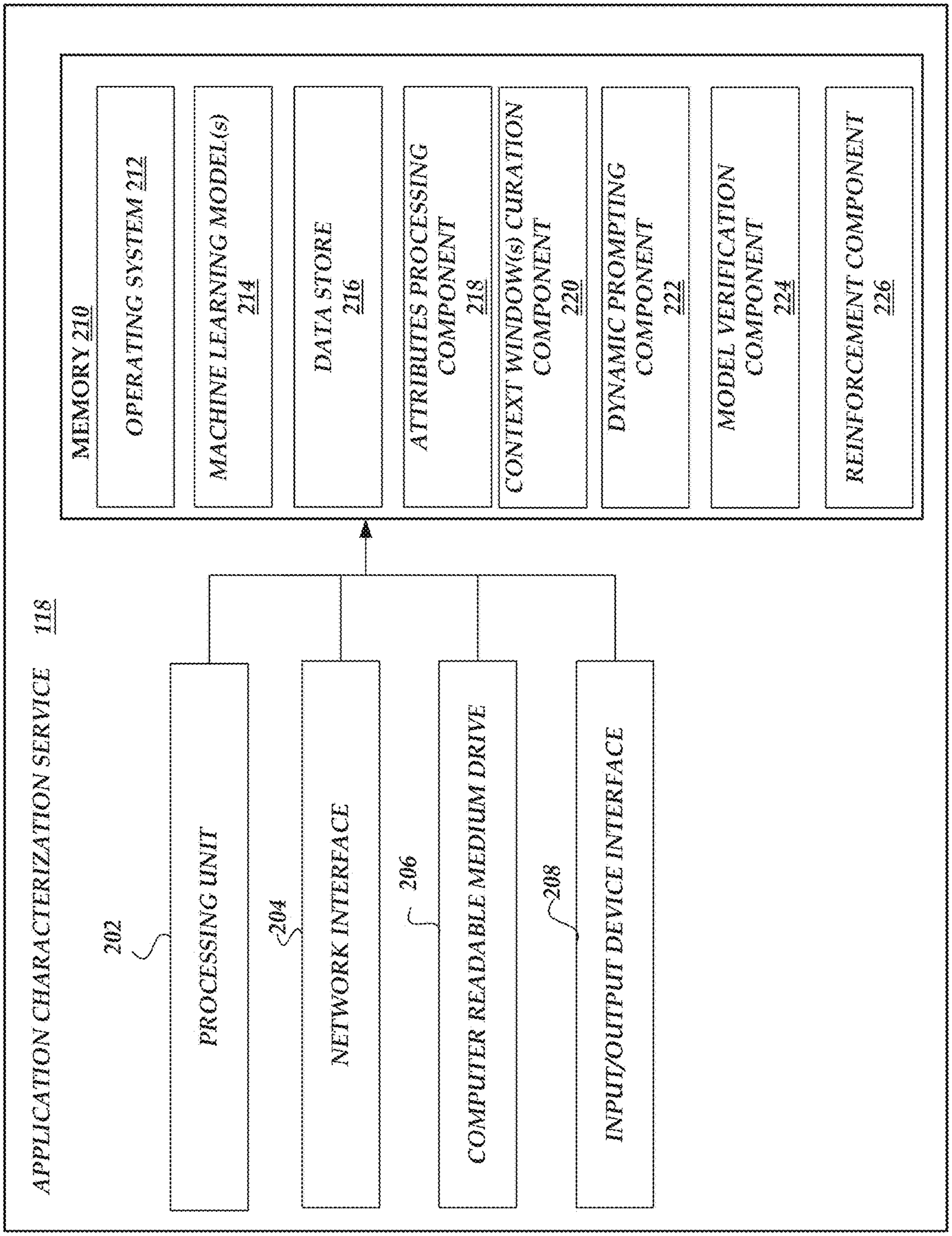
FIG. 2 is a block diagram of illustrative components of an application characterization service.

FIG. 2 illustrates an embodiment of an architecture, for example, application characterization service 118. The application characterization service 118 is configured to identify attributes of the network-based applications (e.g., from the set of application attributes of the applications) and characterize the risk associated with each attribute. The attributes derived from the network-based application (e.g., its set of application attributes) can include data (such as types, locations, and amount of data), policy, raw data, source code, computation procedure (e.g., computational diagram), and/or any other information associated with usage (e.g., expected usage once the application is deployed) of the network-based applications.

In some embodiments, the application characterization service 118 processes identified attributes to efficiently allocate computing resources for assessing the associated risks. In certain examples, the application characterization service 118 can implement a machine learning model and a generative agent that processes prompt (e.g., input to the machine learning model, such as attribute(s)) by utilizing the machine learning model. For example, this generative agent interacts with an embedded model within the application characterization service, providing prompts to the machine learning model and generating responses based on its output of the machine learning model. In some examples, the generative agent operates within a context window, which refers to the maximum number of inputs it can process.

In various examples, the service 118 may truncate the attributes of the network-based application to allow the application characterization service to allocate more resources for deeper analysis of potentially high-risk attributes. For example, the application characterization service may characterize attributes of the network-based application by identifying similar attributes (e.g., for the purpose of description referred to as "relevant vectorized historical attribute") stored in a relevancy vector database. The relevancy vector database can store historical attribute data and their associated usage information derived from previous characterizations of network-based applications. The application characterization service 118 can search this database for similar attributes and their associated data usage (historical data usage). For instance, after characterizing a network-based application, the results can be stored in the relevancy vector database. Each characterized attribute is vectorized, and its associated data usage is stored by linking it to the corresponding attribute. The data usage may include various factors, such as the data resources, policies governing access to those resources, vulnerabilities (e.g., network or computational vulnerabilities), and the availability of the data to perform tasks in relation to the attribute. In some cases, data usage may be correlated with security risk. For example, if a data resource is identified as empty based on historical data usage (e.g., the system historically could not perform tasks associated with the attribute due to data unavailability or an empty data resource), the security risk may be classified as "none." In such cases, the system may not proceed with characterizing the attribute, identifying it instead as an unknown attribute, an unavailable data resource, or similar.

After initially evaluating the risks with the identified attributes (e.g., without processing the identified attributes to determine the behavior of the application associated with the attributes and its characterized risk), the application characterization service 118 can filter the number of attributes based on predefined risk criteria. For instance, the attributes identified, having a risk level higher than "low" (e.g., in categories such as low, medium, or high) may be filtered out. This filtering process, referred to as a truncation, reduces the number of attributes, conserving computing resources and enabling more focused characterization on the remaining The application characterization service 118 can also implement a machine learning model to perform one or more embodiments, as disclosed herein. In some cases, the application characterization service 118 can verify the machine learning model by analyzing hallucination results generated from the machine learning model.

The general architecture of the application characterization service 118 depicted in FIG. 2 includes an arrangement of computer hardware and software components that may be used to implement aspects of the present disclosure. As illustrated, the application characterization service 118 includes a processing unit 202, a network interface 204, a computer-readable medium drive 206, and an input/output device interface 208, all of which may communicate with one another by way of a communication bus. The components of the application characterization service 118 may be physical hardware components or implemented in a virtualized environment. The processing unit 202 can include general-purpose central processing units (CPUs), which are generally adapted for executing one or few instructions at a time, and tensor processing units (TPUs), which may be specially adapted for handling the demanding computations for training neural networks, such as deep learning tasks, and/or graphics processing units (GPUs), which contain hundreds or thousands of co-processors that compute instructions in parallel. The application characterization service 118 can include various logic circuitries to perform the processing operation of the processing unit 202. The present disclosure does not limit the types and numbers of the processing unit and logic circuitry.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208. In some embodiments, the application characterization service 118 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 212 that provides computer program instructions for use by the processing unit 202 in the general administration and operation of the application characterization service 118. The memory 210 may further include computer program instructions and other information for implementing aspects of the present disclosure. In some embodiments, the processing unit 202, the network interface 204, the computer-readable medium drive 206, the input/output device interface 208, and the memory 210 can be integrated as an integrated circuit chip, such as silicon on chip. In some examples, these components can be integrated as an application specific integrated circuit.

The memory 210 may include a machine learning model. The machine learning model 214 could be used to assist in the characterization of the attributes of the network-based application performed by the application characterization service 118. Illustratively, the machine learning model 214 can be trained to identify attributes of the network-based applications (from the set of application attributes of the applications) and characterize each attribute. Such attributes can also be referred to as inputs and can include data (such as types, locations, and amount of data), policy, raw data, source code, computation procedure (e.g., computational diagram), and/or any other information associated with usage of the network-based applications. In some cases, the machine learning model can be trained with specific input data by associating it with identified risks. For example, after completing the attributes characterization on the network-based application, the characterization results can be characterized by paring the inputs (e.g., attribute of the application) and identified risk associated with the input. In this example, the paring can be performed by determining the vector representation of the input and its associated risk. Thus, the machine learning model 214 can be trained by storing the vector representation of each attribute with the associated risk in a database, such as a relevancy database, as disclosed herein. Then, the machine learning model 214, after identifying the inputs, can compare each attribute with the data stored in the relevancy vector database to determine the potential risk associated with each attribute.

A number of different types of models may be used by the machine learning model 214 to generate the models. The model can include a large language model and various other models, such as supervised learning model, unsupervised learning model, semi-supervised learning model, reinforcement learning model, deep learning model, and/or ensemble learning model. In addition, certain embodiments herein may use a logistical regression model, decision trees, random forests, convolutional neural networks, deep networks, or others. However, other models are possible, such as a linear regression model, a discrete choice model, or a generalized linear model. The machine learning algorithms can be configured to adaptively develop and update the models over time based on new input received by the machine learning model 214. Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning models.

In some embodiments, memory 210 can include a data store 216, which serves as a dedicated area to store various types of data used by the application characterization service 118. For example, the data store 216 may contain a relevancy vector database and an output database. The relevancy vector database stores multiple inputs (e.g., attributes of the network-based applications) associated with their assessed risks. After the application characterization service 118 evaluates inputs from a network-based application, it stores the input and its characterized risk in the relevancy vector database. These inputs are vectorized, correlating the vectorized attribute with its determined risk. Prior to vectorization, each attribute is tokenized, ensuring that the tokenized input matches its corresponding risk. This vectorization enables efficient searching of similar inputs within the relevancy vector database by comparing vector distances between the input (current inputs identified from the network-based application) and other stored data.

Additionally, the data store 216 may include an output database that records results from the characterization, including any hallucinated results identified during the verification process. If hallucinated results are detected, they are stored in the output database. After generating characterization outputs, the service 118 can filter out hallucinated results by cross-referencing the output with the data in the output database, preventing the use of invalid results.

Memory 210 also includes an ATTRIBUTES PROCESSING component 218, configured to process inputs from the network-based application. In some cases, the ATTRIBUTES PROCESSING component 218 obtains a set of application attributes of an application (e.g., from configuration service 114 or any service 112A, 112B, or 112C) and identifies attributes from it. In some examples, the network-based application is built based on its set of application attributes, which defines the application's functionality. These attributes within the set of application attributes can manage various aspects of the application's functionality or behavior, such as database connections, user permissions, feature toggles, and more.

In certain embodiments, the ATTRIBUTES PROCESSING component 218 classifies these attributes based on specific criteria, such as functionalities, data resource access, security capabilities, or associated policies. For example, attributes related to encryption of data access may be grouped together. Each group of classified attributes can then generate prompts that instruct the generative agent to perform specific actions by utilizing machine learning model 214. For instance, if an attribute involves access to a database in a particular city, the prompt may instruct the generative agent to evaluate the policies governing access to that database, ensuring compliance with local regulations.

In some examples, the ATTRIBUTES PROCESSING component 218 can perform a tokenization of the attribute. In some examples, the ATTRIBUTES PROCESSING component 218 can tokenize the attributes to a level similar to the data stored in the relevancy vector database. For example, the attribute "arn:aws:cloudformation:us-east-1:671471118425: stack/DatabaseStack-d1f24867-f826-4520-b2f9-8ac72751d4c6/8e8425f0-794a-11ee-85dd-1272e2b5acdf" can be tokenized into three groups: "arn:aws," "us-east-1:671471118425," and "stack/DatabaseStack-d1f24867-f826-4520-b2f9-8ac72751d4c6/8e8425f0-794a-11ee-85dd-1272e2b5acdf." These tokenized attributes are then used to search for similar data in the relevancy vector database.

The ATTRIBUTES PROCESSING component 218 can further perform truncation of the identified attributes. For instance, after tokenization, each tokenized attribute can be converted into a vector representation, which may include high-dimensional values. These vectorized attributes are compared against similar vectors stored in the relevancy vector database by measuring vector distance. For example, an attribute like "us-east-1:671471118425" might be vectorized as "[0.2, 0.8, −0.4, . . . , 1.2]." The ATTRIBUTES PROCESSING component 218 can then search for similar vectors in the database, comparing the distance between "[0.2, 0.8, −0.4, . . . , 1.2]" and the stored vectors.

In some embodiments, the relevancy vector database stores historical attribute data and their associated usage information derived from previous characterizations of network-based applications. The application characterization service 118 can search this database for similar attributes and their corresponding historical data usage. For example, after characterizing a network-based application, the results are stored in the relevancy vector database. Each characterized attribute is vectorized, and its associated data usage is linked to the respective attribute.

The data usage may include various factors such as data resources, policies governing access, vulnerabilities (e.g., network or computational vulnerabilities), and the availability of data to perform tasks related to the attribute. In some cases, data usage is correlated with security risk. For instance, if a data resource is identified as empty based on historical data usage (e.g., the system was historically unable to perform tasks due to unavailable or empty data), the security risk may be classified as "none." In such cases, the system may skip further characterization of the attribute, labeling it as an unknown attribute, unavailable data resource, or similar.

In various embodiments, truncation is performed based on the identified data usage and security risk associated with each attribute of the network-based application. For example, after identifying and vectorizing attributes from the application, the ATTRIBUTES PROCESSING component 218 accesses the relevancy vector database. It searches for a relevant vectorized historical attribute among the stored historical attributes. The ATTRIBUTES PROCESSING component 218 compares the vector distance between each vectorized attribute and the historical attributes stored in the database. The relevant vectorized historical attribute is one that falls within a threshold vector distance, such as 0.1, 0.2, or 0.3. These threshold distances are examples, and the specific threshold can be application-dependent.

Once the relevant vectorized historical attribute is identified, the ATTRIBUTES PROCESSING component 218 can retrieve its associated historical data usage and analyze it for any security risks. For example, if the historical activity involved accessing an IP address known for distributing malware, the activity may be flagged as a potential security risk. Conversely, if the activity involved accessing a database that contained no data, the activity could be marked as "unavailable." In other cases, activities like providing geolocation information may be classified as low-risk informational activities. These examples are illustrative, and the types of activities are not limited by this description.

In various embodiments, the ATTRIBUTES PROCESSING component 218 can truncate identified attributes based on their associated security risks. For example, if an attribute's security risk (determined from the relevancy vector database) is classified as "unknown" (e.g., the historical data usage shows an empty data resource), the attribute can be filtered out without further characterization. If the security risk is classified as low (e.g., the historical data usage involves informational activities like showing the location of a database), the attribute may be truncated. However, if an attribute's security risk is identified as high (e.g., the historical data usage indicates access to a database associated with malware distribution), the application characterization service 118 may proceed with characterizing the attribute to assess any potential risks.

The memory 210 may include a context window curation component 220 configured to select which attributes to include in the context window to ensure efficient processing. In some embodiments, the attributes can be curated based on their relevance, risk level, or any restrictions. Non-essential or restricted (e.g., an attribute indicating accessing to a restricted data resource) attributes may be excluded to prioritize higher-risk or more critical data. For example, if the system detects an input accessing a restricted address, the context window curation component may flag it and exclude it from further analysis until the restriction is lifted. This prevents the system from wasting resources on less relevant or restricted data and ensures that priority inputs undergo immediate risk evaluation.

The context window curation component helps the system efficiently manage input data, optimize resource use, and ensure that only the most relevant information is processed within the model's capacity.

In some embodiments, the context window curation component 220 tracks the data paths associated with attributes obtained the network-based application. For instance, if the application accesses various data sources across different regions with different policies, the context window curation component 220 identifies the access requirements for each path. If certain paths are restricted, non-essential, or identified (previously identified) as high risk, they may be flagged by the component. Metadata for each attribute and its associated data path can be managed in a table, allowing the system to easily flag attributes that access to restricted paths.

In some cases, the context window curation component 220 may detect paths leading to IP addresses associated with distributing malware. These paths would be flagged as high risk by the context window curation component. While these examples are illustrative, the present disclosure is not limited to these specific scenarios.

The memory 210 may also include a dynamic prompting component 222. The dynamic prompting component 222 can be configured to update prompts, such as the instructions or input request, in response to changing conditions. The conditions can refer to any events that triggers dynamical change in the prompt, such as changes in how the application characterization service behaves or processes the inputs. In some examples, an input with restricted IP addresses can trigger the dynamic prompting component 222 to modify the prompt, such that the prompt is modified to supplement specific policy associated with accessing restricted IP addresses. In some examples, the prompt can be modified to adapt new policies or rules, generally can be referred to as parameters, (e.g., security protocols, encryption requirements, or compliance regulations) that dictate how inputs should be processed such that if the input requires encryption or special access privileges, the dynamic prompting component 222 may supplement additional instructions into the prompt to handle this policy.

Illustratively, when the input address "stack/DatabaseStack-d1f24867-f826-4520-b2f9-8ac72751d4c6/8e8425f0-794a-11ee-85dd-1272e2b5acdf," is identified as a restricted address, the dynamic prompting component 222 can instruct the prompt to dynamically supplement a policy associated with accessing this address. Illustratively, the policy may provide a specific encryption key or network environment to access the address. Thus, the dynamic prompting component 222 can further evaluate risk associated with accessing the inputs based on the supplemented policy. In some examples, when the prompt is dynamically changed (e.g., the new policy is supplemented), the application characterization service can perform regression testing to ensure that the characterization (to other inputs) have not been affected due to the changed prompt.

In some scenarios, one or more new malware attack vectors are newly identified. In these scenarios, the dynamic prompting component 222 may supplement policies that any routine address related to the malware attack vectors to be rerouted.

In some embodiments, the machine learning model 214 may perform reinforcement learning based on the dynamically updated or supplemented prompt. In some embodiments, reinforcement learning can be performed without updating the machine learning model (e.g., tunning node weights, changing configuration setting, changing control variable, tunning coefficients value for each variable, updating variables, etc.). Instead, the machine learning model can maintain a persistent version stored in memory 210, while the data used by the model can be updated based on supplemented policies. In some cases, the pre-assessed applications can be reassessed (e.g., recharacterized) the risk after reinforcing the machine learning model 214.

The memory 210 may also include a model verification component 224 configured to verify the machine learning model's outputs. In some embodiments, the data store 216 includes an output database that stores various results from the characterization process, including any identified hallucinated results. For example, during the verification process, the system may detect one or more hallucinated outputs. These hallucinated results are then stored in the output database by the application characterization service 118.

After generating a set of characterization output for each attribute, the model verification component 224 compares the result with the data stored in the output database. If the generated output matches any previously identified hallucinated results, the model verification component 224 filters out these outputs to prevent the use of hallucinated data in further processing.

The memory 210 may also include a reinforcement component 226. In some embodiments, reinforcement component 226 clusters the inputs and their corresponding network-based application characterization. Clustering can be achieved by representing each attribute and output as vectors, with the data grouped based on vector distances within a defined threshold. Data points within this threshold from a cluster centroid are grouped together.

In some cases, each cluster is further evaluated by assigning a confidence score. For instance, post-evaluation of the application characterization service (e.g., the machine learning model) can be conducted to identify false positives or negatives within each cluster. Based on this evaluation, a confidence score is assigned to each cluster.

The memory 210 shown in FIG. 2 is merely illustrated as an example, and the present disclosure is not limited thereto, and one or more system components, computing devices or processors can be used to execute computer program instructions that the processing unit 202 executes in order to implement one or more embodiments disclosed in the present disclosure. Accordingly, reference to memory is intended in a general sense and should not be construed as limiting to any particular embodiment or configuration.

Figure 3:
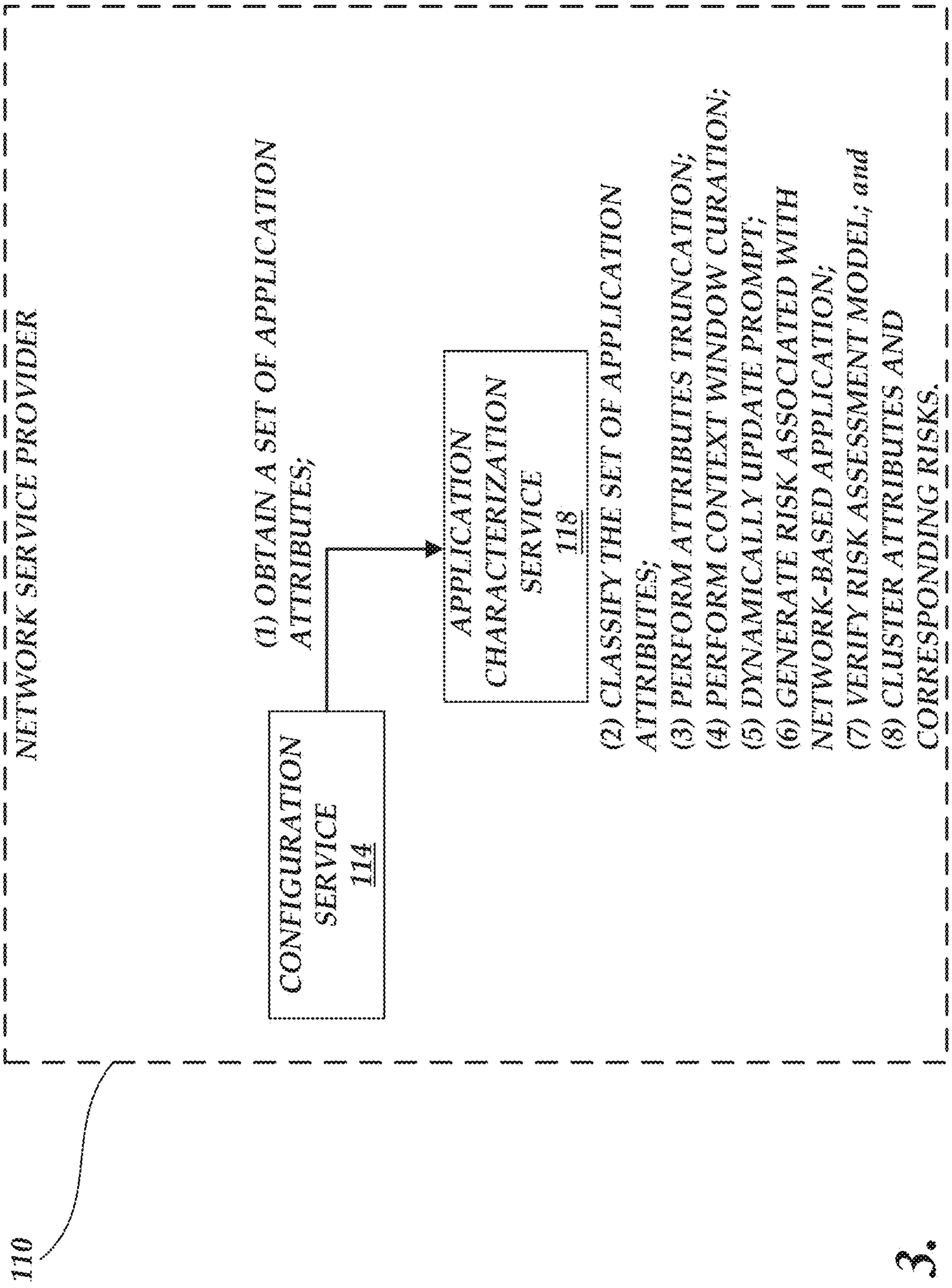
FIG. 3 is an example of an illustrative interaction of performing network-based application characterization in accordance with the embodiments disclosed herein.
Figure 4:
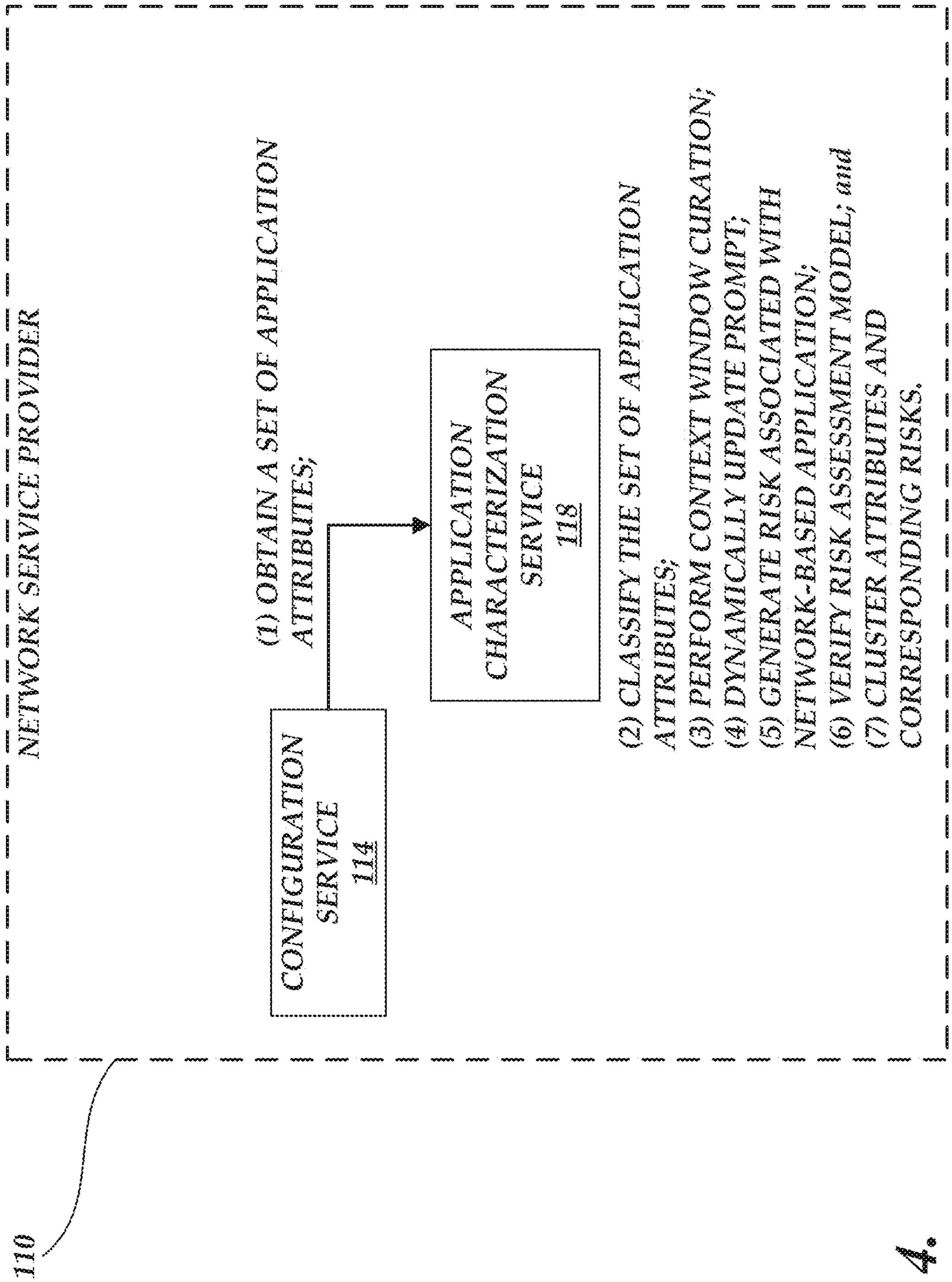
FIG. 4 is another example of an illustrative interaction of performing network-based application characterization in accordance with embodiments disclosed herein.
Figure 5:
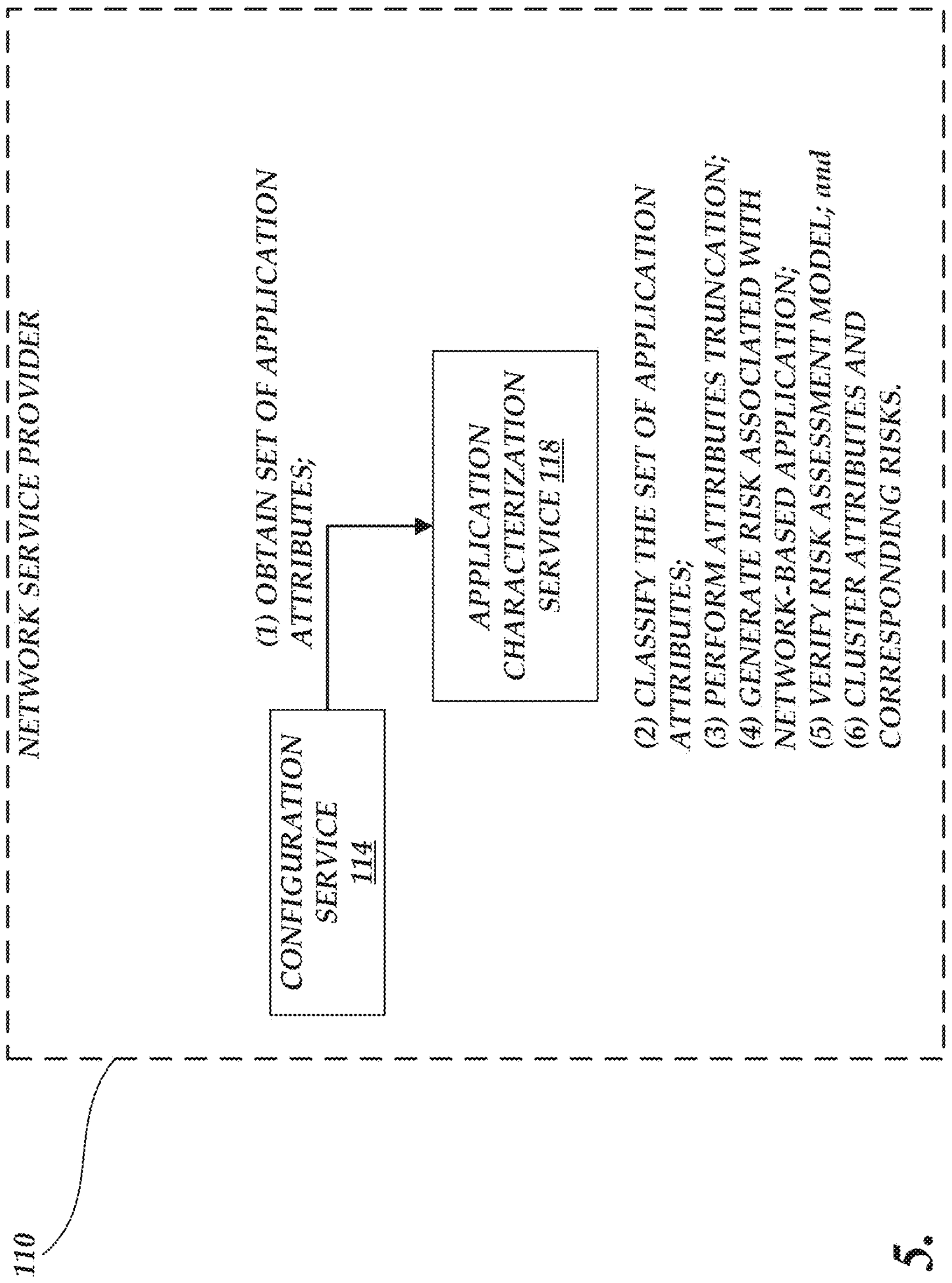
FIG. 5 is another example of an illustrative interaction of performing network-based application characterization in accordance with embodiments disclosed herein.

Turning now to FIGS. 3-5, illustrative interactions of the components of the system 100, as shown in FIG. 1, will be described. For purposes of the illustration, it can be assumed that a network provider 110 has been configured in a manner to implement a plurality of network services 112 on behalf of a customer (shown in FIG. 1). The present application is not intended to be limited to any particular type of network-based application configured (e.g., built) from the configuration service 114. The network-based application can be accessed or generate processing results as part of the characterization before deploying the network-based application to the customer (shown in FIG. 1) via the API of the customer computing device 102. Furthermore, the present application is not intended to be limited to the number of network service providers 110. The examples of interaction illustrated in FIGS. 3-5 can utilize the machine learning model 214.

With reference to FIG. 3, an example of an illustrative interaction of performing network-based application characterization in accordance with embodiments disclosed herein. The interaction is illustrative. At (1), the application characterization service 118 obtains a set of application attributes of an application (e.g., from configuration service 114 or any service 112A, 112B, or 112C) and identifies attributes from it. In some examples, the network-based application is built based on its set of application attributes, which defines the application's functionality. These attributes within the set of application attributes can manage various aspects of the application's functionality or behavior, such as database connections, user permissions, feature toggles, and more. In some embodiments, the machine learning model 214 can be trained to scan attributes of the network-based applications from the set of application attributes.

At (2), the application characterization service 118 classifies obtained attributes based on specific criteria, such as functionalities, data resource access, security capabilities, or associated policies. For example, attributes related to encryption of data access may be grouped together. Each group of classified attributes can then generate prompts that instruct the generative agent to perform specific actions by utilizing machine learning model 214. For instance, if an attribute involves access to a database in a particular city, the prompt may instruct the generative agent to evaluate the policies governing access to that database, ensuring compliance with local regulations.

In some examples, the application characterization service 118 can perform a tokenization of the attribute. In some examples, the application characterization service 118 can tokenize the attributes to a level similar to the data stored in the relevancy vector database. For example, the attribute "arn:aws:cloudformation:us-east-1:671471118425: stack/DatabaseStack-d1f24867-f826-4520-b2f9-8ac72751d4c6/8e8425f0-794a-11ee-85dd-1272e2b5acdf" can be tokenized into three groups: "arn:aws," "us-east-1:671471118425," and "stack/DatabaseStack-d1f24867-f826-4520-b2f9-8ac72751d4c6/8e8425f0-794a-11ee-85dd-1272e2b5acdf." These tokenized attributes are then used to search for similar data in the relevancy vector database.

At (3), the application characterization service 118 performs attributes truncation. For instance, after tokenization, each tokenized attribute can be converted into a vector representation, which may include high-dimensional values. These vectorized attributes are compared against similar vectors stored in the relevancy vector database by measuring vector distance. For example, an attribute like "us-east-1: 671471118425" might be vectorized as "[0.2, 0.8, −0.4, . . . , 1.2]." The ATTRIBUTES PROCESSING component 218 can then search for similar vectors in the database, comparing the distance between "[0.2, 0.8, −0.4, . . . , 1.2]" and the stored vectors.

In some embodiments, the relevancy vector database stores historical attribute data and their associated usage information, derived from previous characterizations of network-based applications. The application characterization service 118 can search this database for similar attributes and their corresponding historical data usage. For example, after characterizing a network-based application, the results are stored in the relevancy vector database. Each characterized attribute is vectorized, and its associated data usage is linked to the respective attribute.

The data usage may include various factors such as data resources, policies governing access, vulnerabilities (e.g., network or computational vulnerabilities), and the availability of data to perform tasks related to the attribute. In some cases, data usage is correlated with security risk. For instance, if a data resource is identified as empty based on historical data usage (e.g., the system was historically unable to perform tasks due to unavailable or empty data), the security risk may be classified as "none." In such cases, the system may skip further characterization of the attribute, labeling it as an unknown attribute, unavailable data resource, or similar.

In various embodiments, truncation is performed based on the identified data usage and security risk associated with each attribute of the network-based application. For example, after identifying and vectorizing attributes from the application, the application characterization service 118 accesses the relevancy vector database. It searches for a relevant vectorized historical attribute among the stored historical attributes. The application characterization service 118 compares the vector distance between each vectorized attribute and the historical attributes stored in the database. The relevant vectorized historical attribute is one that falls within a threshold vector distance. In this regard, distance relates to some measurement of differences in values, such as 0.1, 0.2, or 0.3. However, one skilled in the relevant art will appreciate that the threshold distances are illustrative in nature, and the specific threshold can be application-dependent and encompass any one of a variety of values.

Once the relevant vectorized historical attribute is identified, the application characterization service 118 can retrieve its associated historical data usage and analyze it for any security risks. For example, if the historical activity involved accessing an IP address known for distributing malware, the activity may be flagged as a potential security risk. Conversely, if the activity involved accessing a database that contained no data, the activity could be marked as "unavailable." In other cases, activities like providing geolocation information may be classified as low-risk informational activities. These examples are illustrative, and the types of activities are not limited by this description. In various embodiments, the application characterization service 118 can truncate identified attributes based on their associated security risks. For example, if an attribute's security risk (determined from the relevancy vector database) is classified as "unknown" (e.g., the historical data usage shows an empty data resource), the attribute can be filtered out without further characterization. If the security risk is classified as low (e.g., the historical data usage involves informational activities like showing the location of a database), the attribute may be truncated. However, if an attribute's security risk is identified as high (e.g., the historical data usage indicates access to a database associated with malware distribution), the application characterization service 118 may proceed with characterizing the attribute to assess any potential risks.

At (4), the application characterization service 118 performs context window curation. The application characterization service 118 can be configured to select which attributes to include in the context window to ensure efficient processing. In some embodiments, the attributes can be curated based on their relevance, risk level, or any restrictions. Non-essential or restricted (e.g., attribute indicating accessing to a restricted data resource) attribute may be excluded to prioritize higher-risk or more critical data. For example, if the application characterization service 118 detects an input accessing a restricted address, the application characterization service 118 may flag it and exclude it from further analysis until the restriction is lifted. This prevents the application characterization service 118 from wasting resources on less relevant or restricted data and ensures that priority inputs undergo immediate risk evaluation.

The application characterization service 118 can help the system (or the network service provider) efficiently manage input data, optimize resource use, and ensure that only the most relevant information is processed within the model's capacity (e.g., context window).

In some embodiments, the application characterization service 118 can the data paths associated with attributes obtained the network-based application. For instance, if the application accesses various data sources across different regions with different policies, the application characterization service 118 identifies the access requirements for each path. If certain paths are restricted, non-essential, or identified (previously identified) as high risk, they may be flagged by the component. Metadata for each attribute and its associated data path can be managed in a table, allowing the system to easily flag attributes that access to restricted paths.

In some cases, the application characterization service 118 may detect paths leading to IP addresses associated with distributing malware. These paths would be flagged as high risk by the context window curation component. While these examples are illustrative, the present disclosure is not limited to these specific scenarios.

At (5), the application characterization service 118 dynamically updates prompt. The application characterization service 118 can be configured to update prompts, such as the instructions or input request, in response to changing conditions. The conditions can refer to any events that triggers dynamical change in the prompt, such as changes in how the application characterization service behaves or processes the inputs. In some examples, an input with restricted IP addresses can trigger the application characterization service 118 to modify the prompt, such that the prompt is modified to supplement specific policy associated with accessing restricted IP addresses. In some examples, the prompt can be modified to adapt new policies or rules, generally can be referred to as parameters, (e.g., security protocols, encryption requirements, or compliance regulations) that dictate how inputs should be processed such that if the input requires encryption or special access privileges, the application characterization service 118 may supplement additional instructions into the prompt to handle this policy.

In some cases, when the attribute identifies an address "stack/DatabaseStack-d1f24867-f826-4520-b2f9-8ac72751d4c6/8e8425f0-794a-11ee-85dd-1272e2b5acdf," is identified as a restricted address, the application characterization service 118 can instruct the prompt to dynamically supplement a policy associated with accessing this address. Illustratively, the policy may provide a specific encryption key or network environment to access the address. Thus, the application characterization service 118 can further evaluate risk associated with accessing the inputs based on the supplemented policy. In some examples, when the prompt is dynamically changed (e.g., the new policy is supplemented), the application characterization service can perform regression testing to ensure that the characterizations (to other inputs) have not been affected due to the changed prompt.

In some scenarios, one or more new malware attack vectors are newly identified. In these scenarios, the application characterization service 118 may supplement policies that any routine address related with the malware attack vectors to be rerouted.

In some embodiments, the machine learning model 214 may perform reinforcement learning based on the dynamically updated or supplemented prompt. In some cases, the pre-assessed applications can be reassessing the risk after reinforcing the machine learning model 214.

Steps (6)-(8) are related to generating risk (e.g., characterization of the processed attributes) and verifying the generated risk (characterized attributes). At (6), in response updating the prompt, the application characterization service 118, by utilizing the machine learning model, can generate risk associated with each attribute. Such risk can be classified as low, medium, and high risk.

At (7), the application characterization service 118 can verify the machine learning model's outputs (e.g., the generated risk). In some embodiments, the data store 216 includes an output database that stores various results from the characterization process, including any identified hallucinated results. For example, during the verification process, the system may detect one or more hallucinated outputs. These hallucinated results are then stored in the output database by the application characterization service 118. After generating a characterization output for each attribute, the application characterization service 118 compares the result with the data stored in the output database. If the generated output matches any previously identified hallucinated results, the application characterization service 118 filters out these outputs to prevent the use of hallucinated data in further processing.

At (8), the application characterization service 118 can cluster the attributes and their corresponding network-based application characterization (e.g., characterized attributes). Clustering can be achieved by representing each attribute and output as vectors, with the data grouped based on vector distances within a defined threshold. Data points within this threshold from a cluster centroid are grouped together.

In some cases, each cluster is further evaluated by assigning a confidence score. For instance, post-evaluation of the application characterization service (e.g., the machine learning model) can be conducted to identify false positives or negatives within each cluster. Based on this evaluation, a confidence score is assigned to each cluster.

Although the process illustrated in FIG. 3 is described in a particular order, it should be understood that this process is not limited as such. The process may be performed in an alternative order, serially, or at least partially in parallel. For example, step (5) can be performed before step (4).

With reference to FIG. 4, an example of an illustrative interaction of performing network-based application characterization in accordance with embodiments disclosed herein. The interaction is illustrative. At (1), the application characterization service 118 obtains a set of application attributes of an application (e.g., from configuration service 114 or any service 112A, 112B, or 112C) and identifies attributes from it. In some examples, the network-based application is built based on its set of application attributes, which defines the application's functionality. These attributes within the set of application attributes can manage various aspects of the application's functionality or behavior, such as database connections, user permissions, feature toggles, and more. In some embodiments, the machine learning model 214 can be trained to scan attributes of the network-based applications from the set of application attributes.

At (2), the application characterization service 118 classifies these attributes based on specific criteria, such as functionalities, data resource access, security capabilities, or associated policies. For example, attributes related to encryption of data access may be grouped together. Each group of classified attributes can then generate prompts that instruct the generative agent to perform specific actions by utilizing machine learning model 214. For instance, if an attribute involves access to a database in a particular city, the prompt may instruct the generative agent to evaluate the policies governing access to that database, ensuring compliance with local regulations.

In some examples, the application characterization service 118 can perform a tokenization of the attribute. In some examples, the application characterization service 118 can tokenize the attributes to a level similar to the data stored in the relevancy vector database. For example, the attribute "arn:aws:cloudformation:us-east-1:671471118425: stack/DatabaseStack-d1f24867-f826-4520-b2f9-8ac72751d4c6/8e8425f0-794a-11ee-85dd-1272e2b5acdf" can be tokenized into three groups: "arn:aws," "us-east-1:671471118425," and "stack/DatabaseStack-d1f24867-f826-4520-b2f9-8ac72751d4c6/8e8425f0-794a-11ee-85dd-1272e2b5acdf." These tokenized attributes are then used to search for similar data in the relevancy vector database."

In some embodiments, the relevancy vector database stores historical attribute data and their associated usage information, derived from previous characterizations of network-based applications. The application characterization service 118 can search this database for similar attributes and their corresponding historical data usage. For example, after characterizing a network-based application, the results are stored in the relevancy vector database. Each characterized attribute is vectorized, and its associated data usage is linked to the respective attribute.

The data usage may include various factors such as data resources, policies governing access, vulnerabilities (e.g., network or computational vulnerabilities), and the availability of data to perform tasks related to the attribute. In some cases, data usage is correlated with security risk. For instance, if a data resource is identified as empty based on historical data usage (e.g., the system was historically unable to perform tasks due to unavailable or empty data), the security risk may be classified as "none." In such cases, the system may skip further characterization of the attribute, labeling it as an unknown attribute, unavailable data resource, or similar.

In various embodiments, truncation is performed based on the identified data usage and security risk associated with each attribute of the network-based application. For example, after identifying and vectorizing attributes from the application, the application characterization service 118 accesses the relevancy vector database. It searches for a relevant vectorized historical attribute among the stored historical attributes. The application characterization service 118 compares the vector distance between each vectorized attribute and the historical attributes stored in the database. The relevant vectorized historical attribute is one that falls within a threshold vector distance, such as 0.1, 0.2, or 0.3. These threshold distances are examples, and the specific threshold can be application-dependent.

Once the relevant vectorized historical attribute is identified, the application characterization service 118 can retrieve its associated historical data usage and analyze it for any security risks. For example, if the historical activity involved accessing an IP address known for distributing malware, the activity may be flagged as a potential security risk. Conversely, if the activity involved accessing a database that contained no data, the activity could be marked as "unavailable." In other cases, activities like providing geolocation information may be classified as low-risk informational activities. These examples are illustrative, and the types of activities are not limited by this description. In various embodiments, the application characterization service 118 can truncate identified attributes based on their associated security risks. For example, if an attribute's security risk (determined from the relevancy vector database) is classified as "unknown" (e.g., the historical data usage shows an empty data resource), the attribute can be filtered out without further characterization. If the security risk is classified as low (e.g., the historical data usage involves informational activities like showing the location of a database), the attribute may be truncated. However, if an attribute's security risk is identified as high (e.g., the historical data usage indicates access to a database associated with malware distribution), the application characterization service 118 may proceed with characterizing the attribute to assess any potential risks.

At (3), the application characterization service 118 performs context window curation. The application characterization service 118 can be configured to select which attributes to include in the context window to ensure efficient processing. In some embodiments, the attributes can be curated based on their relevance, risk level, or any restrictions. Non-essential or restricted (e.g., attribute indicating accessing to a restricted data resource) attribute may be excluded to prioritize higher-risk or more critical data. For example, if the application characterization service 118 detects an input accessing a restricted address, the application characterization service 118 may flag it and exclude it from further analysis until the restriction is lifted. This prevents the application characterization service 118 from wasting resources on less relevant or restricted data and ensures that priority inputs undergo immediate risk evaluation.

The application characterization service 118 can help the system (or the network service provider) efficiently manage input data, optimize resource use, and ensure that only the most relevant information is processed within the model's capacity (e.g., context window).

In some embodiments, the application characterization service 118 can the data paths associated with attributes obtained the network-based application. For instance, if the application accesses various data sources across different regions with different policies, the application characterization service 118 identifies the access requirements for each path. If certain paths are restricted, non-essential, or identified (previously identified) as high risk, they may be flagged by the component. Metadata for each attribute and its associated data path can be managed in a table, allowing the system to easily flag attributes that access to restricted paths.

In some cases, the application characterization service 118 may detect paths leading to IP addresses associated with distributing malware. These paths would be flagged as high risk by the context window curation component. While these examples are illustrative, the present disclosure is not limited to these specific scenarios.

At (4), the application characterization service 118 dynamically updates prompt. The application characterization service 118 can be configured to update prompts, such as the instructions or input request, in response to changing conditions. The conditions can refer to any events that triggers dynamical change in the prompt, such as changes in how the application characterization service behaves or processes the inputs. In some examples, an input with restricted IP addresses can trigger the application characterization service 118 to modify the prompt, such that the prompt is modified to supplement specific policy associated with accessing restricted IP addresses. In some examples, the prompt can be modified to adapt new policies or rules, generally can be referred to as parameters, (e.g., security protocols, encryption requirements, or compliance regulations) that dictate how inputs should be processed such that if the input requires encryption or special access privileges, the application characterization service 118 may supplement additional instructions into the prompt to handle this policy.

In some cases, when the input address "stack/DatabaseStack-d1f24867-f826-4520-b2f9-8ac72751d4c6/8e8425f0-794a-11ee-85dd-1272e2b5acdf," is identified as a restricted address, the application characterization service 118 can instruct the prompt to dynamically supplement a policy associated with accessing this address. Illustratively, the policy may provide a specific encryption key or network environment to access the address. Thus, the application characterization service 118 can further evaluate risk associated with accessing the inputs based on the supplemented policy. In some examples, when the prompt is dynamically changed (e.g., the new policy is supplemented), the application characterization service can perform regression testing to ensure that the characterization (to other inputs) have not been affected due to the changed prompt.

In some scenarios, one or more new malware attack vectors are newly identified. In these scenarios, the application characterization service 118 may supplement policies that any routine address related with the malware attack vectors to be rerouted.

In some embodiments, the machine learning model 214 may perform reinforcement learning based on the dynamically updated or supplemented prompt. In some cases, the pre-assessed applications can be reassessing the risk after reinforcing the machine learning model 214.

Steps (5)-(7) are related to generating risk (e.g., characterization of the processed attributes) and verifying the generated risk (characterized attributes). At (5), in response updating the prompt, the application characterization service 118, by utilizing the machine learning model, can generate risk associated with each attribute. Such risk can be classified as low, medium, and high risk.

At (6), the application characterization service 118 can verify the machine learning model's outputs (e.g., the generated risk). In some embodiments, the data store 216 includes an output database that stores various results from the characterization process, including any identified hallucinated results. For example, during the verification process, the system may detect one or more hallucinated outputs. These hallucinated results are then stored in the output database by the application characterization service 118. After generating a characterization output for each attribute, the application characterization service 118 compares the result with the data stored in the output database. If the generated output matches any previously identified hallucinated results, the application characterization service 118 filters out these outputs to prevent the use of hallucinated data in further processing.

At (7), the application characterization service 118 can cluster the inputs and their corresponding network-based application characterization (e.g., characterized attributes). Clustering can be achieved by representing each attribute and output as vectors, with the data grouped based on vector distances within a defined threshold. Data points within this threshold from a cluster centroid are grouped together.

In some cases, each cluster is further evaluated by assigning a confidence score. For instance, post-evaluation of the application characterization service (e.g., the machine learning model) can be conducted to identify false positives or negatives within each cluster. Based on this evaluation, a confidence score is assigned to each cluster.

Although the process illustrated in FIG. 4 is described in a particular order, it should be understood that this process is not limited as such. The process may be performed in an alternative order, serially, or at least partially in parallel. For example, step (4) can be performed before step (3).

With reference to FIG. 5, an example of an illustrative interaction of performing network-based application characterization in accordance with embodiments disclosed herein. The interaction is illustrative. At (1), the application characterization service 118 obtains a set of application attributes of an application (e.g., from configuration service 114 or any service 112A, 112B, or 112C) and identifies attributes from it. In some examples, the network-based application is built based on its set of application attributes, which defines the application's functionality. These attributes within the set of application attributes can manage various aspects of the application's functionality or behavior, such as database connections, user permissions, feature toggles, and more. In some embodiments, the machine learning model 214 can be trained to scan attributes of the network-based applications from the set of application attributes.

At (2), the application characterization service 118 classifies the attributes based on specific criteria, such as functionalities, data resource access, security capabilities, or associated policies. For example, attributes related to encryption of data access may be grouped together. Each group of classified attributes can then generate prompts that instruct the generative agent to perform specific actions by utilizing machine learning model 214. For instance, if an attribute involves access to a database in a particular city, the prompt may instruct the generative agent to evaluate the policies governing access to that database, ensuring compliance with local regulations.

In some examples, the application characterization service 118 can perform a tokenization of the attribute. In some examples, the application characterization service 118 can tokenize the attributes to a level similar to the data stored in the relevancy vector database. For example, the attribute "arn:aws:cloudformation:us-east-1:671471118425: stack/DatabaseStack-d1f24867-f826-4520-b2f9-8ac72751d4c6/8e8425f0-794a-11ee-85dd-1272e2b5acdf" can be tokenized into three groups: "arn:aws," "us-east-1:671471118425," and "stack/DatabaseStack-d1f24867-f826-4520-b2f9-8ac72751d4c6/8e8425f0-794a-11ee-85dd-1272e2b5acdf." These tokenized attributes are then used to search for similar data in the relevancy vector database.

At (3), the application characterization service 118 performs attributes truncation. For instance, after tokenization, each tokenized attribute can be converted into a vector representation, which may include high-dimensional values. These vectorized attributes are compared against similar vectors stored in the relevancy vector database by measuring vector distance. For example, an attribute like "us-east-1:671471118425" might be vectorized as "[0.2, 0.8, −0.4, . . . , 1.2]." The ATTRIBUTES PROCESSING component 218 can then search for similar vectors in the database, comparing the distance between "[0.2, 0.8, −0.4, . . . , 1.2]" and the stored vectors.

The relevancy vector database stores a plurality of inputs associated with their assessed risks. After the application characterization service 118 evaluates inputs from a network-based application, it stores the input and its risk in the relevancy vector database. These inputs are vectorized, correlating the vectorized attribute with its determined risk. Prior to vectorization, each attribute is tokenized, ensuring that the tokenized input matches its corresponding risk. This vectorization enables efficient searching of similar inputs within the relevancy vector database by comparing vector distances between the input (current inputs identified from the network-based application) and other stored data.

In some cases, the machine learning model can be trained with specific input data by associating it with identified risks. For example, after completing the characterization on the network-based applications, the assessment results can be characterized by paring the inputs and identifying the risk associated with the input. In this example, the paring can be performed by determining the vector representation of the input and its associated risk. Thus, the machine learning model 214 can be trained by storing the vector representation of each attribute with the associated risk in a database, such as a relevancy vector database, as disclosed herein. Then, the machine learning model 214, after identifying the inputs, can compare each attribute with the data stored in the relevancy vector database to determine the potential risk associated with each attribute.

Steps (4)-(6) are related to generating risk (e.g., characterization of the processed attributes) and verifying the generated risk (characterized attributes). At (4), in response updating the prompt, the application characterization service 118, by utilizing the machine learning model, can generate risk associated with each attribute. Such risk can be classified as low, medium, and high risk.

At (5), the application characterization service 118 can verify the machine learning model's outputs (e.g., the generated risk). In some embodiments, the data store 216 includes an output database that stores various results from the characterization process, including any identified hallucinated results. For example, during the verification process, the system may detect one or more hallucinated outputs. These hallucinated results are then stored in the output database by the application characterization service 118. After generating a characterization output for each attribute, the application characterization service 118 compares the result with the data stored in the output database. If the generated output matches any previously identified hallucinated results, the application characterization service 118 filters out these outputs to prevent the use of hallucinated data in further processing.

At (6), the application characterization service 118 can cluster the attributes and their corresponding network-based application characterization (e.g., characterized attributes). Clustering can be achieved by representing each attribute and output as vectors, with the data grouped based on vector distances within a defined threshold. Data points within this threshold from a cluster centroid are grouped together.

In some cases, each cluster is further evaluated by assigning a confidence score. For instance, post-evaluation of the application characterization service (e.g., the machine learning model) can be conducted to identify false positives or negatives within each cluster. Based on this evaluation, a confidence score is assigned to each cluster.

Figure 6:
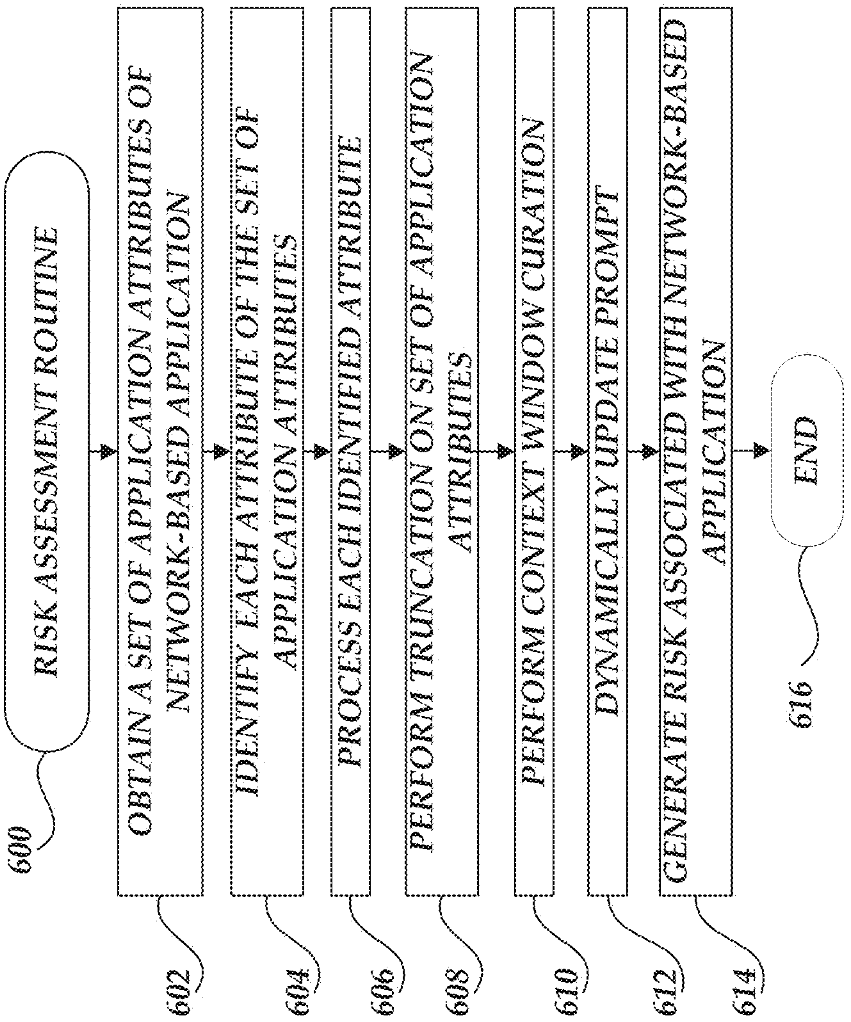
FIG. 6 is a flow diagram illustrative of a routine for network-based application characterization utilizing an application characterization service.

Turning now to FIG. 6, a routine 600 for characterization routine utilizing an application characterization service 118 will be described.

At block 602, the application characterization service 118 obtains a set of application attributes of a network-based application (e.g., from configuration service 114). At block 604, the application characterization service 118 identifies attributes. In some examples, the network-based application is built based on its set of application attributes, which defines the application's functionality. These attributes within the set of application attributes can manage various aspects of the application's functionality or behavior, such as database connections, user permissions, feature toggles, and more. In some embodiments, the machine learning model 214 can be trained to scan attributes of the network-based applications from the set of application attributes.

At block 606, the application characterization service 118 processes the identified attributes. In some embodiments, the application characterization service 118 classifies these attributes based on specific criteria, such as functionalities, data resource access, security capabilities, or associated policies. For example, attributes related to encryption of data access may be grouped together. Each group of classified attributes can then generate prompts that instruct the generative agent to perform specific actions by utilizing machine learning model 214. For instance, if an attribute involves access to a database in a particular city, the prompt may instruct the generative agent to evaluate the policies governing access to that database, ensuring compliance with local regulations.

In some examples, the application characterization service 118 can perform a tokenization of the attribute. In some examples, the application characterization service 118 can tokenize the attributes to a level similar to the data stored in the relevancy vector database. For example, the attribute "arn:aws:cloudformation:us-east-1:671471118425: stack/DatabaseStack-d1f24867-f826-4520-b2f9-8ac72751d4c6/8e8425f0-794a-11ee-85dd-1272e2b5acdf" can be tokenized into three groups: "arn:aws," "us-east-1:671471118425," and "stack/DatabaseStack-d1f24867-f826-4520-b2f9-8ac72751d4c6/8e8425f0-794a-11ee-85dd-1272e2b5acdf." These tokenized attributes are then used to search for similar data in the relevancy vector database.

In some embodiments, the relevancy vector database stores historical attribute data and their associated usage information, derived from previous characterizations of network-based applications. The application characterization service 118 can search this database for similar attributes and their corresponding historical data usage. For example, after characterizing a network-based application, the results are stored in the relevancy vector database. Each characterized attribute is vectorized, and its associated data usage is linked to the respective attribute.

The data usage may include various factors such as data resources, policies governing access, vulnerabilities (e.g., network or computational vulnerabilities), and the availability of data to perform tasks related to the attribute. In some cases, data usage is correlated with security risk. For instance, if a data resource is identified as empty based on historical data usage (e.g., the system was historically unable to perform tasks due to unavailable or empty data), the security risk may be classified as "none." In such cases, the system may skip further characterization of the attribute, labeling it as an unknown attribute, unavailable data resource, or similar.

In various embodiments, truncation is performed based on the identified data usage and security risk associated with each attribute of the network-based application. For example, after identifying and vectorizing attributes from the application, the application characterization service 118 accesses the relevancy vector database. It searches for a relevant vectorized historical attribute among the stored historical attributes. The application characterization service 118 compares the vector distance between each vectorized attribute and the historical attributes stored in the database. The relevant vectorized historical attribute is one that falls within a threshold vector distance, such as 0.1, 0.2, or 0.3. These threshold distances are examples, and the specific threshold can be application-dependent.

Once the relevant vectorized historical attribute is identified, the application characterization service 118 can retrieve its associated historical data usage and analyze it for any security risks. For example, if the historical activity involved accessing an IP address known for distributing malware, the activity may be flagged as a potential security risk. Conversely, if the activity involved accessing a database that contained no data, the activity could be marked as "unavailable." In other cases, activities like providing geolocation information may be classified as low-risk informational activities. These examples are illustrative, and the types of activities are not limited by this description. In various embodiments, the application characterization service 118 can truncate identified attributes based on their associated security risks. For example, if an attribute's security risk (determined from the relevancy vector database) is classified as "unknown" (e.g., the historical data usage shows an empty data resource), the attribute can be filtered out without further characterization. If the security risk is classified as low (e.g., the historical data usage involves informational activities like showing the location of a database), the attribute may be truncated. However, if an attribute's security risk is identified as high (e.g., the historical data usage indicates access to a database associated with malware distribution), the application characterization service 118 may proceed with characterizing the attribute to assess any potential risks.

At block 608, the application characterization service 118 performs attributes truncation. For instance, after tokenization, each tokenized attribute can be converted into a vector representation, which may include high-dimensional values. These vectorized attributes are compared against similar vectors stored in the relevancy vector database by measuring vector distance. For example, an attribute like "us-east-1: 671471118425" might be vectorized as "[0.2, 0.8, −0.4, . . . , 1.2]." The ATTRIBUTES PROCESSING component 218 can then search for similar vectors in the database, comparing the distance between "[0.2, 0.8, −0.4, . . . , 1.2]" and the stored vectors.

The relevancy vector database stores a plurality of inputs associated with their assessed risks. For example, after the application characterization service 118 evaluates attributes from a network-based application, it stores the attributes as inputs and its evaluated risk in the relevancy vector database. These inputs are vectorized, correlating the vectorized attribute with its determined risk. Prior to vectorization, each attribute is tokenized, ensuring that the tokenized input matches its corresponding risk. This vectorization enables efficient searching of similar inputs within the relevancy vector database by comparing vector distances between the input (current inputs identified from the network-based application) and other stored data.

In some cases, the machine learning model can be trained with specific input data by associating it with identified risks. For example, after completing the characterization on the network-based applications, the assessment results can be characterized by paring the inputs and identifying the risk associated with the input. In this example, the paring can be performed by determining the vector representation of the input and its associated risk. Thus, the machine learning model 214 can be trained by storing the vector representation of each attribute with the associated risk in a database, such as a relevancy vector database, as disclosed herein. Then, the machine learning model 214, after identifying the inputs, can compare each attribute with the data stored in the relevancy vector database to determine the potential risk associated with each attribute.

At block 610, the application characterization service 118 performs context window curation. The application characterization service 118 can be configured to select which attributes to include in the context window to ensure efficient processing. In some embodiments, the attributes can be curated based on their relevance, risk level, or any restrictions. Non-essential or restricted (e.g., attribute indicating accessing to a restricted data resource) attribute may be excluded to prioritize higher-risk or more critical data. For example, if the application characterization service 118 detects an input accessing a restricted address, the application characterization service 118 may flag it and exclude it from further analysis until the restriction is lifted. This prevents the application characterization service 118 from wasting resources on less relevant or restricted data and ensures that priority inputs undergo immediate risk evaluation.

The application characterization service 118 can help the system (or the network service provider) efficiently manage input data, optimize resource use, and ensure that only the most relevant information is processed within the model's capacity (e.g., context window).

In some embodiments, the application characterization service 118 can track the data paths associated with inputs obtained the network-based application. For instance, if the application accesses various data sources across different regions with different policies, the application characterization service 118 identifies the access requirements for each path. If certain paths are restricted, non-essential, or identified (previously identified) as high risk, they may be flagged by the component. Metadata for each attribute and its associated data path can be managed in a table, allowing the system to easily flag inputs that access restricted paths.

In some cases, the application characterization service 118 may detect paths leading to IP addresses associated with distributing malware. These paths would be flagged as high risk by the context window curation component. While these examples are illustrative, the present disclosure is not limited to these specific scenarios.

At block 612, the application characterization service 118 dynamically updates prompt. The application characterization service 118 can be configured to update prompts, such as the instructions or input request, in response to changing conditions. The conditions can refer to any events that triggers dynamical change in the prompt, such as changes in how the application characterization service behaves or processes the inputs. In some examples, an input with restricted IP addresses can trigger the application characterization service 118 to modify the prompt, such that the prompt is modified to supplement specific policy associated with accessing restricted IP addresses. In some examples, the prompt can be modified to adapt new policies or rules, generally can be referred to as parameters, (e.g., security protocols, encryption requirements, or compliance regulations) that dictate how inputs should be processed such that if the input requires encryption or special access privileges, the application characterization service 118 may supplement additional instructions into the prompt to handle this policy.

In some cases, when the input address "stack/DatabaseStack-d1f24867-f826-4520-b2f9-8ac72751d4c6/8e8425f0-794a-11ee-85dd-1272e2b5acdf," is identified as a restricted address, the application characterization service 118 can instruct the prompt to dynamically supplement a policy associated with accessing this address. Illustratively, the policy may provide a specific encryption key or network environment to access the address. Thus, the application characterization service 118 can further evaluate risk associated with accessing the inputs based on the supplemented policy. In some examples, when the prompt is dynamically changed (e.g., the new policy is supplemented), the application characterization service can perform regression testing to ensure that the characterizations (to other inputs) have not been affected due to the changed prompt.

In some scenarios, one or more new malware attack vectors are newly identified. In these scenarios, the application characterization service 118 may supplement policies that any routine address related with the malware attack vectors to be rerouted.

In some embodiments, the machine learning model 214 may perform reinforcement learning based on the dynamically updated or supplemented prompt. In some cases, the pre-assessed applications can be reassessing the risk after reinforcing the machine learning model 214.

At block 614 in response updating the prompt, the application characterization service 118, by utilizing the machine learning model, can generate risk associated with each attribute of the network-based application. Such risk can be classified as low, medium, and high risk.

In some embodiments, the application characterization service 118 can verify the machine learning model's outputs (e.g., the generated risk). In some embodiments, the data store 216 includes an output database that stores various results from the characterization process, including any identified hallucinated results. For example, during the verification process, the system may detect one or more hallucinated outputs. These hallucinated results are then stored in the output database by the application characterization service 118. After generating a characterization output for each attribute, the application characterization service 118 compares the result with the data stored in the output database. If the generated output matches any previously identified hallucinated results, the application characterization service 118 filters out these outputs to prevent the use of hallucinated data in further processing.

In some embodiments, the application characterization service 118 can cluster the inputs and their corresponding network-based application characterization. Clustering can be achieved by representing each attribute and output as vectors, with the data grouped based on vector distances within a defined threshold. Data points within this threshold from a cluster centroid are grouped together.

In some cases, each cluster is further evaluated by assigning a confidence score. For instance, post-evaluation of the application characterization service (e.g., the machine learning model) can be conducted to identify false positives or negatives within each cluster. Based on this evaluation, a confidence score is assigned to each cluster. The routine 600 can be ended at block 616.

Although the routine 600 illustrated in FIG. 6 is described in a particular order, it should be understood that this routine 600 is not limited as such. The routine 600 may be performed in an alternative order, serially, or at least partially in parallel. For example, block 612 can be performed before block 610.

Figure 7:
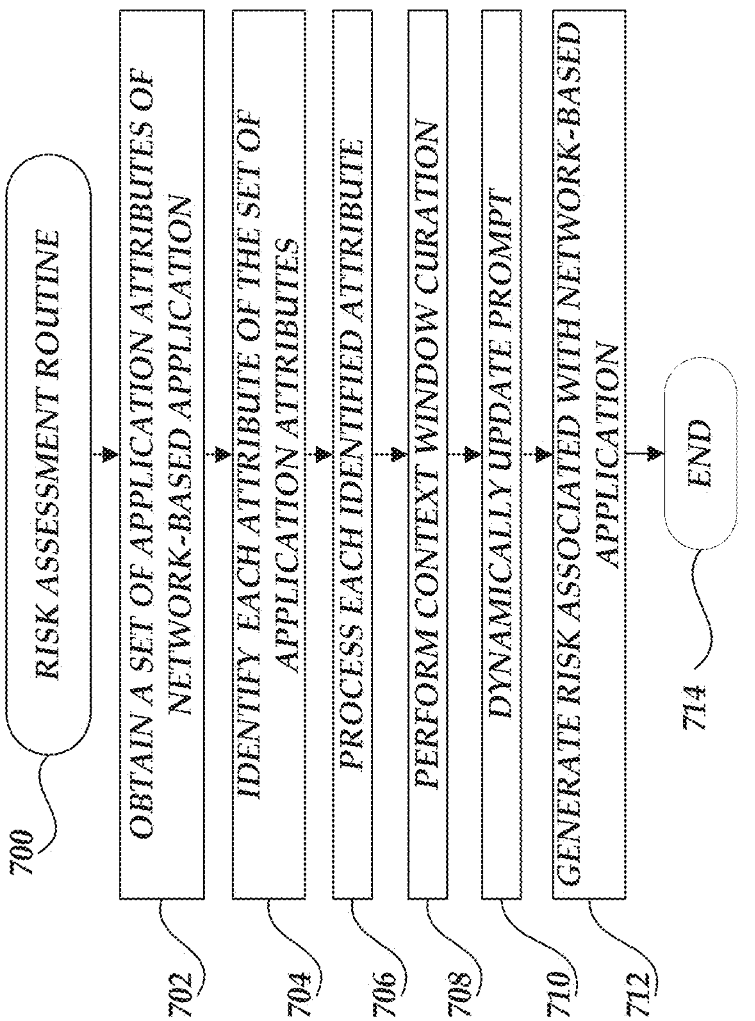
FIG. 7 is another example of a flow diagram illustrative of a routine for network-based application characterization utilizing an application characterization service.

Turning now to FIG. 7, a routine 700 for another example of a characterization routine utilizing an application characterization service 118 will be described.

At block 702, the application characterization service 118 obtains a set of application attributes of a network-based application (e.g., from configuration service 114). At block 704, the application characterization service 118 identifies attributes. In some examples, the network-based application is built based on its set of application attributes, which defines the application's functionality. These attributes within the set of application attributes can manage various aspects of the application's functionality or behavior, such as database connections, user permissions, feature toggles, and more. In some embodiments, the machine learning model 214 can be trained to scan attributes of the network-based applications from the set of application attributes.

At block 706, the application characterization service 118 processes the identified attributes. In some embodiments, the application characterization service 118 classifies these attributes based on specific criteria, such as functionalities, data resource access, security capabilities, or associated policies. For example, attributes related to encryption of data access may be grouped together. Each group of classified attributes can then generate prompts that instruct the generative agent to perform specific actions by utilizing machine learning model 214. For instance, if an attribute involves access to a database in a particular city, the prompt may instruct the generative agent to evaluate the policies governing access to that database, ensuring compliance with local regulations.

In some examples, the application characterization service 118 can perform a tokenization of the attribute. In some examples, the application characterization service 118 can tokenize the attributes to a level similar to the data stored in the relevancy vector database. For example, the attribute "arn:aws:cloudformation:us-east-1:671471118425: stack/DatabaseStack-d1f24867-f826-4520-b2f9-8ac72751d4c6/8e8425f0-794a-11ee-85dd-1272e2b5acdf" can be tokenized into three groups: "arn:aws," "us-east-1:671471118425," and "stack/DatabaseStack-d1f24867-f826-4520-b2f9-8ac72751d4c6/8e8425f0-794a-11ee-85dd-1272e2b5acdf." These tokenized attributes are then used to search for similar data in the relevancy vector database.

At block 706, the application characterization service 118 performs context window curation. The application characterization service 118 can be configured to select which attributes to include in the context window to ensure efficient processing. In some embodiments, the attributes can be curated based on their relevance, risk level, or any restrictions. Non-essential or restricted (e.g., attribute indicating accessing to a restricted data resource) attribute may be excluded to prioritize higher-risk or more critical data. For example, if the application characterization service 118 detects an input accessing a restricted address, the application characterization service 118 may flag it and exclude it from further analysis until the restriction is lifted. This prevents the application characterization service 118 from wasting resources on less relevant or restricted data and ensures that priority inputs undergo immediate risk evaluation.

The application characterization service 118 can help the system (or the network service provider) efficiently manage input data, optimize resource use, and ensure that only the most relevant information is processed within the model's capacity (e.g., context window).

In some embodiments, the application characterization service 118 can track the data paths associated with inputs obtained the network-based application. For instance, if the application accesses various data sources across different regions with different policies, the application characterization service 118 identifies the access requirements for each path. If certain paths are restricted, non-essential, or identified (previously identified) as high risk, they may be flagged by the component. Metadata for each attribute and its associated data path can be managed in a table, allowing the system to easily flag inputs that access restricted paths.

In some cases, the application characterization service 118 may detect paths leading to IP addresses associated with distributing malware. These paths would be flagged as high risk by the context window curation component. While these examples are illustrative, the present disclosure is not limited to these specific scenarios.

At block 710, the application characterization service 118 dynamically updates prompt. The application characterization service 118 can be configured to update prompts, such as the instructions or input request, in response to changing conditions. The conditions can refer to any events that triggers dynamical change in the prompt, such as changes in how the application characterization service behaves or processes the inputs. In some examples, an input with restricted IP addresses can trigger the application characterization service 118 to modify the prompt, such that the prompt is modified to supplement specific policy associated with accessing restricted IP addresses. In some examples, the prompt can be modified to adapt new policies or rules, generally can be referred to as parameters, (e.g., security protocols, encryption requirements, or compliance regulations) that dictate how inputs should be processed such that if the input requires encryption or special access privileges, the application characterization service 118 may supplement additional instructions into the prompt to handle this policy.

In some cases, when the input address "stack/DatabaseStack-d1f24867-f826-4520-b2f9-8ac72751d4c6/8e8425f0-794a-11ee-85dd-1272e2b5acdf," is identified as a restricted address, the application characterization service 118 can instruct the prompt to dynamically supplement a policy associated with accessing this address. Illustratively, the policy may provide a specific encryption key or network environment to access the address. Thus, the application characterization service 118 can further evaluate risk associated with accessing the inputs based on the supplemented policy. In some examples, when the prompt is dynamically changed (e.g., the new policy is supplemented), the application characterization service can perform regression testing to ensure that the characterizations (to other inputs) have not been affected due to the changed prompt.

In some scenarios, one or more new malware attack vectors are newly identified. In these scenarios, the application characterization service 118 may supplement policies that any routine address related with the malware attack vectors to be rerouted.

In some embodiments, the machine learning model 214 may perform reinforcement learning based on the dynamically updated or supplemented prompt. In some cases, the pre-assessed applications can be reassessing the risk after reinforcing the machine learning model 214.

At block 712, in response updating the prompt, the application characterization service 118, by utilizing the machine learning model, can generate risk associated with each attribute of the network-based application. Such risk can be classified as low, medium, and high risk.

In some embodiments, the application characterization service 118 can verify the machine learning model's outputs (e.g., the generated risk). In some embodiments, the data store 216 includes an output database that stores various results from the characterization process, including any identified hallucinated results. For example, during the verification process, the system may detect one or more hallucinated outputs. These hallucinated results are then stored in the output database by the application characterization service 118. After generating a characterization output for each attribute, the application characterization service 118 compares the result with the data stored in the output database. If the generated output matches any previously identified hallucinated results, the application characterization service 118 filters out these outputs to prevent the use of hallucinated data in further processing.

In some embodiments, the application characterization service 118 can cluster the inputs and their corresponding network-based application characterization. Clustering can be achieved by representing each attribute and output as vectors, with the data grouped based on vector distances within a defined threshold. Data points within this threshold from a cluster centroid are grouped together.

In some cases, each cluster is further evaluated by assigning a confidence score. For instance, post-evaluation of the application characterization service (e.g., the machine learning model) can be conducted to identify false positives or negatives within each cluster. Based on this evaluation, a confidence score is assigned to each cluster. The routine 600 can be ended at block 714.

Although the routine 700 illustrated in FIG. 7 is described in a particular order, it should be understood that this routine 700 is not limited as such. The routine 700 may be performed in an alternative order, serially, or at least partially in parallel. For example, block 710 can be performed before block 708.

Figure 8:
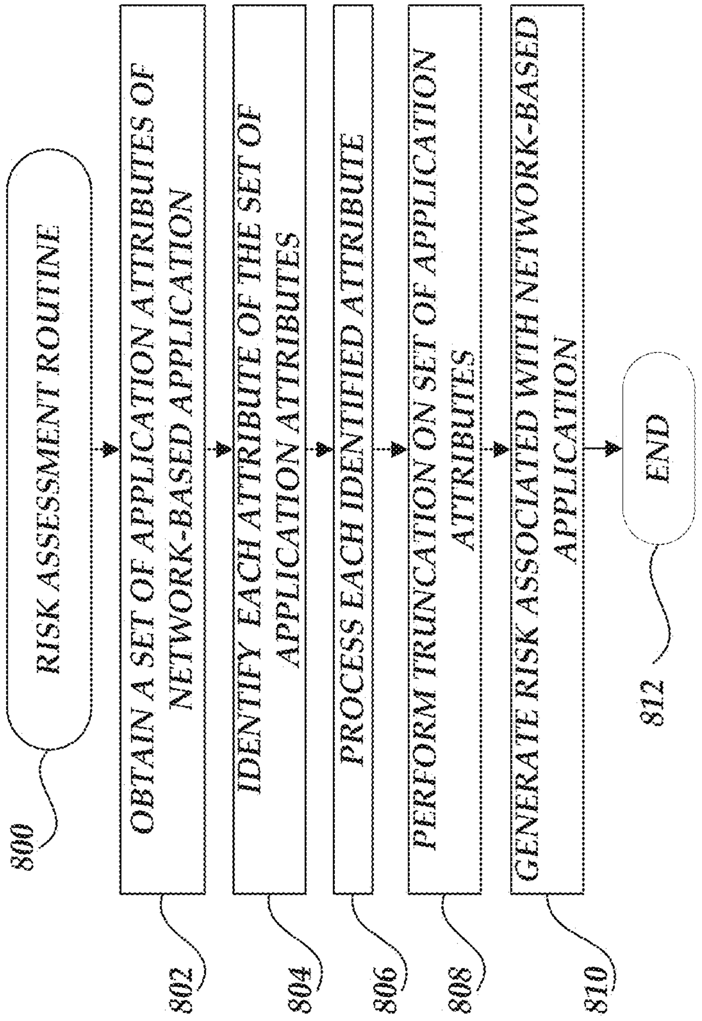
FIG. 8 is another example of a flow diagram illustrative of a routine for network-based application characterization utilizing an application characterization service.

Turning now to FIG. 8, a routine 800 for another example of a characterization routine utilizing an application characterization service 118 will be described.

At block 802, the application characterization service 118 obtains a set of application attributes of a network-based application (e.g., from configuration service 114). At block 804, the application characterization service 118 identifies attributes. In some examples, the network-based application is built based on its set of application attributes, which defines the application's functionality. These attributes within the set of application attributes can manage various aspects of the application's functionality or behavior, such as database connections, user permissions, feature toggles, and more. In some embodiments, the machine learning model 214 can be trained to scan attributes of the network-based applications from the set of application attributes.

At block 806, the application characterization service 118 processes the identified attributes. In some embodiments, the application characterization service 118 classifies these attributes based on specific criteria, such as functionalities, data resource access, security capabilities, or associated policies. For example, attributes related to encryption of data access may be grouped together. Each group of classified attributes can then generate prompts that instruct the generative agent to perform specific actions by utilizing machine learning model 214. For instance, if an attribute involves access to a database in a particular city, the prompt may instruct the generative agent to evaluate the policies governing access to that database, ensuring compliance with local regulations.

In some examples, the application characterization service 118 can perform a tokenization of the attribute. In some examples, the application characterization service 118 can tokenize the attributes to a level similar to the data stored in the relevancy vector database. For example, the attribute "arn:aws:cloudformation:us-east-1:671471118425: stack/DatabaseStack-d1f24867-f826-4520-b2f9-8ac72751d4c6/8e8425f0-794a-11ee-85dd-1272e2b5acdf" can be tokenized into three groups: "arn:aws," "us-east-1:671471118425," and "stack/DatabaseStack-d1f24867-f826-4520-b2f9-8ac72751d4c6/8e8425f0-794a-11ee-85dd-1272e2b5acdf." These tokenized attributes are then used to search for similar data in the relevancy vector database.

In some embodiments, the relevancy vector database stores historical attribute data and their associated usage information, derived from previous characterizations of network-based applications. The application characterization service 118 can search this database for similar attributes and their corresponding historical data usage. For example, after characterizing a network-based application, the results are stored in the relevancy vector database. Each characterized attribute is vectorized, and its associated data usage is linked to the respective attribute.

The data usage may include various factors such as data resources, policies governing access, vulnerabilities (e.g., network or computational vulnerabilities), and the availability of data to perform tasks related to the attribute. In some cases, data usage is correlated with security risk. For instance, if a data resource is identified as empty based on historical data usage (e.g., the system was historically unable to perform tasks due to unavailable or empty data), the security risk may be classified as "none." In such cases, the system may skip further characterization of the attribute, labeling it as an unknown attribute, unavailable data resource, or similar.

In various embodiments, truncation is performed based on the identified data usage and security risk associated with each attribute of the network-based application. For example, after identifying and vectorizing attributes from the application, the application characterization service 118 accesses the relevancy vector database. It searches for a relevant vectorized historical attribute among the stored historical attributes. The application characterization service 118 compares the vector distance between each vectorized attribute and the historical attributes stored in the database. The relevant vectorized historical attribute is one that falls within a threshold vector distance, such as 0.1, 0.2, or 0.3. These threshold distances are examples, and the specific threshold can be application-dependent.

Once the relevant vectorized historical attribute is identified, the application characterization service 118 can retrieve its associated historical data usage and analyze it for any security risks. For example, if the historical activity involved accessing an IP address known for distributing malware, the activity may be flagged as a potential security risk. Conversely, if the activity involved accessing a database that contained no data, the activity could be marked as "unavailable." In other cases, activities like providing geolocation information may be classified as low-risk informational activities. These examples are illustrative, and the types of activities are not limited by this description. In various embodiments, the application characterization service 118 can truncate identified attributes based on their associated security risks. For example, if an attribute's security risk (determined from the relevancy vector database) is classified as "unknown" (e.g., the historical data usage shows an empty data resource), the attribute can be filtered out without further characterization. If the security risk is classified as low (e.g., the historical data usage involves informational activities like showing the location of a database), the attribute may be truncated. However, if an attribute's security risk is identified as high (e.g., the historical data usage indicates access to a database associated with malware distribution), the application characterization service 118 may proceed with characterizing the attribute to assess any potential risks.

At block 808, the application characterization service 118 performs attributes truncation. For instance, after tokenization, each tokenized attribute can be converted into a vector representation, which may include high-dimensional values. These vectorized attributes are compared against similar vectors stored in the relevancy vector database by measuring vector distance. For example, an attribute like "us-east-1: 671471118425" might be vectorized as "[0.2, 0.8, −0.4, . . . , 1.2]." The ATTRIBUTES PROCESSING component 218 can then search for similar vectors in the database, comparing the distance between "[0.2, 0.8, −0.4, . . . , 1.2]" and the stored vectors.

The relevancy vector database stores a plurality of inputs associated with their assessed risks. For example, after the application characterization service 118 evaluates attributes from a network-based application, it stores the attributes as inputs and its evaluated risk in the relevancy vector database. These inputs are vectorized, correlating the vectorized attribute with its determined risk. Prior to vectorization, each attribute is tokenized, ensuring that the tokenized input matches its corresponding risk. This vectorization enables efficient searching of similar inputs within the relevancy vector database by comparing vector distances between the input (current inputs identified from the network-based application) and other stored data.

In some cases, the machine learning model can be trained with specific input data by associating it with identified risks. For example, after completing the characterization on the network-based applications, the assessment results can be characterized by paring the inputs and identifying the risk associated with the input. In this example, the paring can be performed by determining the vector representation of the input and its associated risk. Thus, the machine learning model 214 can be trained by storing the vector representation of each attribute with the associated risk in a database, such as a relevancy vector database, as disclosed herein. Then, the machine learning model 214, after identifying the inputs, can compare each attribute with the data stored in the relevancy vector database to determine the potential risk associated with each attribute.

At block 810 in response updating the prompt, the application characterization service 118, by utilizing the machine learning model, can generate risk associated with each attribute of the network-based application. Such risk can be classified as low, medium, and high risk.

In some embodiments, the application characterization service 118 can verify the machine learning model's outputs (e.g., the generated risk). In some embodiments, the data store 216 includes an output database that stores various results from the characterization process, including any identified hallucinated results. For example, during the verification process, the system may detect one or more hallucinated outputs. These hallucinated results are then stored in the output database by the application characterization service 118. After generating a characterization output for each attribute, the application characterization service 118 compares the result with the data stored in the output database. If the generated output matches any previously identified hallucinated results, the application characterization service 118 filters out these outputs to prevent the use of hallucinated data in further processing.

In some embodiments, the application characterization service 118 can cluster the inputs and their corresponding network-based application characterization. Clustering can be achieved by representing each attribute and output as vectors, with the data grouped based on vector distances within a defined threshold. Data points within this threshold from a cluster centroid are grouped together.

In some cases, each cluster is further evaluated by assigning a confidence score. For instance, post-evaluation of the application characterization service (e.g., the machine learning model) can be conducted to identify false positives or negatives within each cluster. Based on this evaluation, a confidence score is assigned to each cluster. The routine 600 can be ended at block 812.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be fully automated via software code modules, including one or more specific computer-executable instructions executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of customer computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable customer computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without customer input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed:

1. A system for characterizing attributes of a network-based application, the system comprising:

one or more computing processors and memories for executing computer-executable instructions to implement an application characterization service, wherein the application characterization service is configured to:

obtain a set of application attributes of the network-based application, wherein the set of application attributes corresponds to a configuration of the network-based application that utilizes one or more network-based services, and wherein individual attributes of the set of application attributes identify data resources utilized for operations of the network-based application;

identify, for an individual attribute of the set of application attributes, a policy associated with accessing a data resource identified by the individual attribute;

vectorize each attribute of the set of application attributes to generate a corresponding vectorized attribute;

for each vectorized attribute, identify relevant vectorized historical attribute by:

accessing a relevancy vector database, the relevancy vector database configured to store a plurality of vectorized historical attributes and associated data usage information, wherein the associated data usage information includes, for each vectorized historical attribute, historical data usage obtained from prior characterizations of the vectorized historical attributes performed for one or more other historical network-based applications, determining a vector distance between the respective vectorized attribute and each of the plurality of vectorized historical attributes stored in the relevancy vector database, identifying, from the plurality of vectorized historical attributes, a relevant vectorized historical attribute having a vector distance within a threshold distance, and determining the data usage information corresponding to the relevant vectorized historical attribute, wherein the data usage information indicates at least a security risk associated with the historical data usage;

truncate the set of application attributes to reduce the number of attributes by filtering the set of application attributes based on the security risk associated with each respective vectorized historical attribute;

provide the truncated set of application attributes to a generative agent comprising a context window and a prompt;

perform a context window curation on the prompt to reduce information included in the prompt and generate a curated prompt that conforms to a pre-defined size associated with the context window of the generative agent;

verify the one or more parameters of each attribute included in the curated prompt by determining whether each attribute included in the curated prompt identifies one or more additional parameters; and in response to determining that one or more attributes included in the curated prompt identify one or more additional parameters:

identifying the one or more additional parameters;

supplementing the curated prompt with the one or more additional parameters representing the policy associated with accessing the data resource identified by the respective attribute; and characterizing risks associated with the respective attribute using the supplemented curated prompt.

2. The system as recited in claim 1, wherein obtaining the set of application attributes comprises classifying functionalities of the network-based application and determining one or more attributes of the set of application attributes to perform each classified functionality.

3. The system as recited in claim 1, wherein the set of application attributes comprises identifications of a combination of types, resources, a volume, and stored locations of data utilized for operations of the network-based application, one or more policies associated with accessing data resources utilized for operations of the network-based application, usage log data of the network-based application, and source codes of the network-based application.

4. The system as recited in claim 1, wherein a number of the truncated set of application attributes is higher than the pre-defined size of the context window.

5. The system as recited in claim 1, wherein the system comprises a machine learning model, and wherein the machine learning model is configured to provide the generative agent and curate the context window by:

for each attribute of the truncated set of application attributes, identifying at least a data path for accessing the data resource identified by the attribute and one or more policies associated with accessing the data resource identified by the attributes;

determining whether access to the data path is restricted based on the one or more policies; and in response to determining that access to the data path is restricted for a respective attribute, filtering the respective attribute from a curated prompt.

6. The system as recited in claim 5, wherein the machine learning model is further configured to:

identify at least a data path associated with the policy associated with accessing the data resource identified by the respective attribute, wherein the data path is determined based on previous connections to the data resource identified by the respective attribute via one or more other previously configured network-based applications;

identify whether accessing the data resource identified by the respective attribute is restricted based on the identified data path, wherein the policy associated with accessing the data resource is flagged as a restricted policy during the previous connections; and in response to identifying that the policy associated with accessing the data resources is not restricted, validate the policy associated with accessing the data resource.

7. The system as recited in claim 5, wherein the machine learning model is further configured to monitor the characterized risks associated with each attribute to determine whether the characterized risks are hallucinated by comparing a pair of the each attribute and the characterized risks with a pair of an input model and a characterized risk of the input model stored in an output database, wherein the output database is configured to store the pair of input model and characterized risk of the input model identified as hallucinated results from historical characterization performed on the one or more other network-based applications.

8. The system as recited in claim 5, wherein the machine learning model is further configured to verify the characterized risks by determining whether the characterized risks include false positives or negatives, cluster the characterized risks associated with corresponding attributes, and determine a confidence score for each characterized risk based on verification results of the characterized risks.

9. The system as recited in claim 1, wherein the security risk associated with each vectorized historical attribute indicates potential risk associated with a respective attribute of the set of application attributes, and wherein the data usage information indicating that the respective vectorized historical attribute is not related to a security threat, is identified as low security risk and filtered out during the truncation.

10. The system as recited in claim 1, wherein the one or more additional parameters include one or more policies associated with accessing the data resource identified by the attribute.

11. The system as recited in claim 1, wherein the one or more memories store a machine learning model, and wherein the one or more computing processors and the one or more memories are integrated on an application specific integrated circuit.

12. A system for providing a characterization of a network-based application, the system comprising:

one or more computing processors and memories for executing computer-executable instructions to implement an application characterization service, the application characterization service comprising a machine learning model, wherein the application characterization service is configured to:

obtain a set of application attributes of the network-based application, wherein the set of application attributes corresponds to a configuration of the network-based application that utilizes one or more network-based services;

identify, for an individual attribute of the set of application attributes, a policy associated with accessing a data resource identified by the individual attribute;

vectorize each attribute of the set of application attributes to generate a corresponding vectorized attribute;

for each vectorized attribute, identify a relevant vectorized historical attribute by:

accessing a relevancy vector database, the relevancy vector database configured to store a plurality of vectorized historical attributes and associated data usage information, wherein the associated data usage information includes, for each vectorized historical attribute, historical data usage obtained from prior characterizations of the vectorized historical attributes performed for one or more other historical network-based applications, determining a vector distance between the respective vectorized attribute and each of the plurality of vectorized historical attributes stored in the relevancy vector database, identifying, from the plurality of vectorized historical attributes, a relevant vectorized historical attribute having a vector distance within a threshold distance, and determining the data usage information corresponding to the relevant vectorized historical attribute, wherein the data usage information indicates at least a security risk associated with the historical data usage;

truncate the set of application attributes to reduce the number of attributes by filtering the set of application attributes based on the security risk associated with each respective vectorized historical attribute; and characterize risks associated with each attribute included in the truncated set of application attributes by utilizing a generative agent provided by the machine learning model, wherein the generative agent provides a prompt including each attribute of the truncated set of application attributes to the machine learning model.

13. The system as recited in claim 12, wherein obtaining the set of application attributes comprises classifying functionalities of the network-based application and determining attributes of the set of application attributes to perform each classified functionality.

14. The system as recited in claim 12, wherein the set of application attributes comprises at least one of identification of a combination of types, resources, a volume, and stored locations of data utilized for operations of the network-based application, one or more policies associated with accessing data resources utilized for operations of the network-based application, usage log data of the network-based application, and source codes of the network-based application.

15. The system as recited in claim 12, wherein the machine learning model of the application characterization service is further configured to:

identify at least a data path associated with the policy associated with accessing the data resource identified by the individual attribute, wherein the data path is determined based on previous connections to the data resource identified by the individual attribute via one or more other previously configured network-based applications;

identify whether accessing the data resource identified by the individual attribute is restricted based on the identified data path, wherein policies associated with accessing the data resource are flagged as restricted policies during the previous connections; and in response to identifying that the policy associated with accessing the data resource is not being restricted, validate the policy associated with accessing the data resource.

16. The system as recited in claim 12, wherein the machine learning model is further configured to monitor the characterized risks associated with each attribute to determine whether the characterized risks are hallucinated by comparing a pair of the each attribute and the characterized risks with a pair of an input model and a characterized risk of the input model stored in an output database, the output database is configured to store the pair of input model and characterized risk of the input model identified as hallucinated results.

17. The system as recited in claim 12, wherein the machine learning model is further configured to tokenize each attribute prior to the vectorization.

18. The system as recited in claim 12, wherein the machine learning model is further configured to verify the characterized risks by determining whether the characterized risks include false positives or false negatives, cluster the characterized risks associated with corresponding attributes, and determine a confidence score for each characterized risk based on verification results of the characterized risks.

19. A system for characterizing attributes of a network-based application, the system comprising:

one or more computing processors and memories for executing computer-executable instructions to implement an application characterization service, wherein the application characterization service is configured to:

obtain a set of application attributes of the network-based application, wherein the set of application attributes corresponds to a configuration of the network-based application that utilizes one or more network-based services, and wherein individual attributes of the set of application attributes identify data resources utilized for operations of the network-based application;

identify, for an individual attribute of the set of application attributes, a policy associated with accessing a data resources identified by the individual attribute;

providing a set of identified attributes to a generative agent provided by a machine learning model, the generative agent comprising a context window and a prompt;

perform a context window curation on the prompt including the set of identified attributes to reduce information included in the prompt to a pre-defined size associated with the context window, the context window curation comprising:

for each attribute of the set of identified attributes, identifying at least a data path for accessing the data resource identified from the attribute and one or more policies associated with accessing the data resource identified by the attribute; and determining whether access to the data path is restricted based on the one or more policies;

in response to determining that access to the data path is restricted for a respective attribute, filtering the respective attribute from a curated prompt; and characterize risks associated with each attribute included in the curated prompt.

20. The system as recited in claim 19, wherein the machine learning model is further configured to verify the characterized risks by determining whether the characterized risks are hallucinated by comparing a pair of the each attribute and the characterized risks with a pair of input model and characterized risk of the input model stored in an output database, the output database is configured to store the pair of an input model and a characterized risk of the input model identified as hallucinated results from the previous characterization performed on the one or more other network-based applications.

21. The system as recited in claim 19, wherein the machine learning model is further configured to verify the characterized risks by determining whether the characterized risks include false positives or negatives, cluster the characterized risks associated with corresponding attributes, and determine a confidence score for each characterized risk based on verification results of the characterized risks.

22. A system for characterizing attributes of a network-based application, the system comprising:

one or more computing processors and memories for executing computer-executable instructions to implement an application characterization service, wherein the application characterization service is configured to:

obtain a set of application attributes of the network-based application, wherein the set of application attributes corresponds to a configuration of the network-based application that utilizes one or more network-based services, individual attributes in the set of application attributes identifying data resources utilized for operations of the network-based application;

identify, for an individual attribute of the set of application attributes, a policy associated with accessing a data resource identified by the individual attribute;

determine that a prompt for a machine learning model including the set of application attributes exceeds a threshold size;

perform a context window curation to reduce information included in the prompt and produce a curated prompt that conforms to a pre-defined size associated with a context window of the machine learning model;

for the individual attribute:

supplement the curated prompt with one or more additional parameters representing the policy associated with accessing a data resource identified by the individual attribute; and characterize risks associated with the individual attribute using the curated prompt after supplementing the curated prompt with the one or more additional parameters.

23. The system as recited in claim 22, wherein the machine learning model is further configured to verify the characterized risks by determining whether the characterized risks are hallucinated by comparing a pair of each attribute and the characterized risks with a pair of an input and a characterized risk associated with the input stored in an output database, the output database is configured to store the pair of the input and the characterized risk associated with the input identified as hallucinated results from previous characterization performed on the one or more other network-based applications.

24. The system as recited in claim 22, wherein the machine learning model is further configured to verify the characterized risks by determining whether the characterized risks include false positives or false negatives, cluster the characterized risks associated with corresponding attributes, and determine a confidence score for each characterized risk based on verification results of the characterized risks.

25. The system as recited in claim 22, wherein the one or more additional parameters are one or more policies associated with accessing the data resource identified by the individual attribute.

* * * * *